(12) United States Patent
Yamagiwa

(10) Patent No.: US 7,608,964 B2
(45) Date of Patent: Oct. 27, 2009

(54) MOTOR, BLOWER, COMPRESSOR, AND AIR CONDITIONER

(75) Inventor: Akio Yamagiwa, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 195 days.

(21) Appl. No.: 10/594,543

(22) PCT Filed: Mar. 28, 2005

(86) PCT No.: PCT/JP2005/005710
§ 371 (c)(1),
(2), (4) Date: Sep. 28, 2006

(87) PCT Pub. No.: WO2005/096470
PCT Pub. Date: Oct. 13, 2005

(65) Prior Publication Data
US 2007/0200445 A1 Aug. 30, 2007

(30) Foreign Application Priority Data
Mar. 31, 2004 (JP) .............................. 2004-104539
Mar. 31, 2004 (JP) .............................. 2004-104540

(51) Int. Cl.
*H02K 21/12* (2006.01)
(52) U.S. Cl. .................. 310/156.32; 310/268
(58) Field of Classification Search ................ 310/156.32–156.37, 268
See application file for complete search history.

(56) References Cited

U.S. PATENT DOCUMENTS 4,605,874 A * 8/1986 Whiteley .................... 310/268
4,658,162 A * 4/1987 Koyama et al. ........... 310/68 R (Continued)

FOREIGN PATENT DOCUMENTS

JP 59-216458 12/1984

(Continued)

OTHER PUBLICATIONS

Takaharu Takeshita et al.; "Sensorless Brushless DC Motor Drives Using Current Estimation Error"; T.Lee Japan,; vol. 115-D, No. 4, '95.

(Continued)

*Primary Examiner*—Quyen Leung
*Assistant Examiner*—Alex W Mok
(74) *Attorney, Agent, or Firm*—Global IP Counselors

(57) ABSTRACT

It is an object of the present invention to provide techniques for improving efficiency and torque of a motor while achieving thinning of the motor. In a brushless DC motor, a rotor includes a magnetic-field creating magnet and a stator includes an armature winding. The magnetic-field creating magnet and the armature winding are placed to locally face in a radial direction orthogonal to an axial direction. This reduces a thickness of the brushless DC motor which extends in the axial direction. Also, a short-circuit yoke plate for joining and magnetically short-circuiting the north pole and the south pole of a permanent magnet is placed on a negative side in the axial direction with respect to the magnetic-field creating magnet. By provision of the short-circuit yoke plate, a magnetic path on a negative side in the axial direction with respect to the magnetic-field creating magnet can be shortened. Accordingly, magnetic reluctance occurring during rotational movement of the brushless DC motor can be reduced, to thereby improve efficiency and torque of the brushless DC motor.

30 Claims, 20 Drawing Sheets

U.S. PATENT DOCUMENTS

| | | | |
|---|---|---|---|
| 4,724,350 A * | 2/1988 | Shiraki et al. | 310/268 |
| 5,581,422 A * | 12/1996 | Umehara | 360/97.01 |
| 5,679,990 A * | 10/1997 | Ushiro | 310/68 B |
| 5,729,102 A * | 3/1998 | Gotou et al. | 318/400.13 |
| 6,005,324 A * | 12/1999 | Kim | 310/268 |
| 6,208,055 B1 * | 3/2001 | Takahashi | 310/156.01 |
| 6,630,764 B1 * | 10/2003 | Dube et al. | 310/177 |
| 2003/0052553 A1 * | 3/2003 | Isozaki et al. | 310/49 R |
| 2003/0107348 A1 * | 6/2003 | Inagawa et al. | 322/22 |
| 2003/0123178 A1 * | 7/2003 | Gotou et al. | 360/73.03 |

FOREIGN PATENT DOCUMENTS

| | | |
|---|---|---|
| JP | S59-216459 | 12/1984 |
| JP | 61-92154 | 5/1986 |
| JP | 64-16243 | 1/1989 |
| JP | 3-086051 | 4/1991 |
| JP | 05-344701 | 12/1993 |
| JP | 06022526 A * | 1/1994 |
| JP | 06-046554 | 2/1994 |
| JP | 08-124736 | 5/1996 |
| JP | 2000-249962 | 9/2000 |
| JP | 2003-189514 | 7/2003 |
| JP | 2003-235185 | 8/2003 |

OTHER PUBLICATIONS

Takaharu Takeshita et al.; "Back EMF Estimation-Based Sensorless Salient-Pole Brushless DC Motor Drives"; T.Lee Japan,; vol. 117-D, No. 1, '97.

* cited by examiner

MOTOR, BLOWER, COMPRESSOR, AND AIR CONDITIONER

CROSS-REFERENCE TO RELATED APPLICATIONS

This U.S. National stage application claims priority under 35 U.S.C. §119(a) to Japanese Patent Application Nos. 2004-104539 and 2004-104540, filed in Japan on Mar. 31, 2004, the entire contents of which are hereby incorporated herein by reference.

TECHNICAL FIELD

The present invention relates to techniques for a motor including an armature and a field element which are rotatable relative to each other on a rotation axis.

BACKGROUND ART

A known example of a motor including an armature and a field element which are rotatable relative to each other on a rotation axis is an axial gap brushless DC motor (which will hereinafter be simply referred to as a "brushless motor"). In general, in an axial gap brushless motor, a rotor includes a magnetic-field creating magnet and a stator includes an armature winding and a yoke plate. Then, a structure in which the magnetic-field creating magnet and the armature winding face each other in an axial direction parallel to a rotation axis is employed.

For the magnetic-field creating magnet of the rotor, a magnet which is plate-shaped and has magnetic poles which are arranged along a thickness thereof (orthogonal to a flat portion) and are different from each other in polarity is employed, for example. Then, the magnetic-field creating magnet is placed such that the flat portion thereof is orthogonal to the rotation axis in order to allow a direction of a magnetic flux of the magnetic-field creating magnet to be parallel to the rotation axis. Also, the armature winding and the yoke plate of the stator are stacked along the rotation axis in order of mention when viewed from a side on which the rotor is placed. The yoke plate is formed of a magnetic plate and is placed such that a flat portion thereof is orthogonal to the rotation axis.

To flow a predetermined current through the armature winding of the foregoing brushless motor causes the magnetic-field creating magnet to function as a magnetic field, so that the rotor makes rotational movement relative to the stator.

For a motor which is characterized in a flat shape thereof such as the foregoing axial gap brushless motor, axial thinning is demanded. However, when a magnet for creating a field magnet and an armature winding face each other in an axial direction as described above, respective widths of the magnetic-field creating magnet and the armature winding, which widths extend in the axial direction, are added to each other, to have difficulties in thinning the motor. To overcome those difficulties, a structure in which a magnetic-field creating magnet and a armature winding do not face each other in an axial direction but face each other in a radial direction perpendicular to the axial direction has been suggested in recent years (refer to Patent Documents 1, 2, and 3, for example).

[Patent Document 1] Japanese Patent Application Laid-Open No. 5-344701

[Patent Document 2] Japanese Patent Application Laid-Open No. 59-216458

[Patent Document 3] Japanese Patent Application Laid-Open No. 59-516459

[Patent Document 4] Japanese Patent Application Laid-Open No. 8-124736

[Patent Document 5] Japanese Patent Application Laid-Open No. 6-46554

[Non-patent Document 1] Takaharu Takeshita and other two, "Control for Sensorless Brushless DC Motor Based on Error in Current Estimation", IEE Transactions D, volume 115, No. 4, pp. 420-427, 1995.

[Non-patent Document 2] Takaharu Takeshita and other three, "Control for Sensorless Brushless DC Motor with Salient Pole Based on Estimation of Motional Electromotive Force", IEE Transactions D, volume 117, No. 1, pp. 98-104, 1997.

DESCRIPTION OF THE INVENTION

To employ a structure in which a magnetic-field creating magnet and an armature winding face each other in a radial direction would increase the size and the length of a magnetic path formed during rotational movement of a motor and also increase the number of air gaps in the magnetic path, to increase magnetic reluctance. As a result, efficiency and torque are reduced. As such, the motor having the foregoing structure could not be suitably applied to a blower of an air conditioner, for example, whose efficiency is particularly weighed heavily.

On the other hand, during rotational movement of the rotor, a magnetic flux of the magnetic-field creating magnet of the rotor travels while also extending orthogonally to the flat portion of the yoke plate of the stator. Accordingly, an induced eddy current occurs in a direction extending from the rotation axis toward a periphery, or in a direction opposite thereto, in the yoke plate by Fleming's right-hand rule. Such occurrence of an eddy current causes reduction in the efficiency of the motor.

In view of the foregoing, it is the first object of the present invention to provide a technique for improving the efficiency and the torque of a motor while achieving thinning of the motor.

Also, it is the second object of the present invention to provide a motor which is capable of suppressing occurrence of an eddy current.

A first aspect of a motor according to the present invention includes an armature (3) and a field element (2) which are rotatable relative to each other on a rotation axis (21) extending in a first direction (L). The armature (3) includes an armature winding (7) which is placed at a distance in a second direction (D) perpendicular to the first direction (L) from the rotation axis (21). The field element (2) includes: a plurality of first yoke plates (41) each of which includes one end which faces the armature winding (7) in the first direction (L) and the other end which does not face the armature winding (7) in the first direction (L) and extends in the second direction (L); and a magnetic-field creating magnet (5) which has a north pole joined to the other end of one of adjacent first yoke plates (41) of the plurality of first yoke plates (41), a south pole joined to the other end of the other of the adjacent first yoke plates (41), and a U-shaped magnetic path (Φ1) which opens to the plurality of first yoke plates (41), and at least locally faces the armature winding (7) in the second direction (D).

A second aspect of the motor according to the present invention is the first embodiment of the motor in which the one ends of the adjacent first yoke plates (41) are connected to each other.

A third aspect the motor according to the present invention is the first embodiment of the motor in which the other ends of the adjacent first yoke plates (41) are connected to each other such that a junction between the other ends of the adjacent first yoke plates (41) does not overlie a boundary between the north pole and the south pole.

A fourth aspect of the motor according to the present invention is the first embodiment of the motor in which each of the plurality of first yoke plates (41) includes a linear outline (411) parallel to the second direction (D).

A fifth aspect of the motor according to the present invention is the first embodiment of the motor in which an interval (461) between the adjacent first yoke plates (41) increases as a distance from the rotation axis (21) increases in the second direction (D).

A sixth aspect of the motor according to the present invention is the fifth embodiment of the motor in which the interval (461) between the adjacent first yoke plates (41) non-linearly increases in proportion to the distance from the rotation axis (21).

A seventh aspect of the motor according to the present invention is the first embodiment of the motor in which the magnetic-field creating magnet (5) is disc-shaped.

An eighth aspect of the motor according to the present invention is the first embodiment of the motor in which the magnetic-field creating magnet (5) includes: at least one permanent magnet (51) in which a north pole and a south pole are laid side by side in the first direction (L); and a second yoke plate (59) which joins the north pole and the south pole of the permanent magnet on a side opposite to a side on which the plurality of first yoke plates (41) are placed.

A ninth aspect of the motor according to the present invention is the first embodiment of the motor in which the magnetic-field creating magnet (5) includes: at least two hexahedron-shaped permanent magnets (53) in each of which a north pole and a south pole are laid side by side in the first direction (L); and a second yoke plate (59) which joins the south pole and the north pole of each of the permanent magnets (53) on a side opposite to a side on which the plurality of first yoke plates (41) are placed.

A tenth aspect of the motor according to the present invention is the eighth embodiment of the motor in which the permanent magnet (51, 53) is a bonded-magnet.

An eleventh aspect of the motor according to the present invention is the tenth embodiment of the motor in which the permanent magnet (51, 53) is formed integrally with either the plurality of first yoke plates (41) or the second yoke plate (59) by injection molding.

A twelfth aspect of the motor according to the present invention is the eighth embodiment of the motor in which a width of the second yoke plate (59) extending in the second direction (D) is larger than a width of the permanent magnet (51, 53) extending in the second direction (D).

A thirteenth aspect of the motor according to the present invention is the eighth embodiment of the motor in which a width of the second yoke plate (59) extending in the first direction (L) is larger than a width of the permanent magnet (51, 53) extending in the first direction (L).

A fourteenth aspect of the motor according to the present invention is the eighth embodiment of the motor in which a portion extending along a portion of the permanent magnet (51, 53) where different polarities are adjacent has a larger width extending in the first direction (L) than the other portions in the second yoke plate (59).

A fifteenth aspect of the motor according to the present invention is the first embodiment of the motor in which the armature (3) further includes a substrate (76) on which the armature winding (7) is placed.

A sixteenth aspect of the motor according to the present invention is the fifteenth embodiment of the motor in which the armature winding 7 is placed on each of surfaces of the substrate (76) which are opposite to each other in the first direction (L).

A seventeenth aspect of the motor according to the present invention is the sixteenth embodiment of the motor in which the armature winding (7) placed on one of the surfaces of the substrate (76) and the armature winding (7) placed on the other of the surfaces of the substrate (76) are misaligned with each other in a rotation direction (R) of the field element (2) which is defined based on the armature (3).

An eighteenth aspect of the motor according to the present invention is the fifteenth embodiment of the motor in which the armature winding (7) is a flat coil in which a conductor is formed by a photolithographic process.

A nineteenth aspect of the motor according to the present invention is the first embodiment of the motor in which the armature (3) and the field element (2) are paired to form one motor set, and a plurality of motor sets are connected to be arranged in the first direction (L) while being centered on the rotation axis (21) in common.

A twentieth aspect of the motor according to the present invention is the nineteenth embodiment of the motor in which the armature windings (7) respectively included in the plurality of motor sets are misaligned with one another in a rotation direction (R) of the field element (2) which is defined based on the armature (3).

A twenty-first aspect of the motor according to the present invention is the first embodiment of the motor in which the armature winding (7) is placed closer to the rotation axis (21) than the magnetic-field creating magnet (5), and the field element (2) and another field element (2) similar to the field element (2) are connected to each other to be arranged in the first direction (L) with the armature (3) being interposed therebetween, while being centered on the rotation axis (21) in common.

A twenty-second aspect of the motor according to the present invention is the first embodiment of the motor in which each of the first yoke plates (41) includes a first flat portion (41a) which forms an air gap (74) in a space between the first flat portion (41a) and the armature winding (7) and a second flat portion (41b) connected to the first flat portion (41a), and the first flat portion (41a) is placed closer to the armature winding (7) than the second flat portion (41b) in the first direction (L).

A twenty-third aspect of the motor according to the present invention is the first embodiment of the motor in which the armature (3) further includes at least one position detection sensor (6) for detecting a position of a magnetic pole of the magnetic-field creating magnet (5), and the position detection sensor (6) is placed in a substantially central region of the armature winding (7).

A twenty-fourth aspect of the motor according to the present invention is the first embodiment of the motor in which the armature (3) further includes at least one position detection sensor (6) for detecting a position of a magnetic pole of the magnetic-field creating magnet (5), and the position detection sensor (6) is displaced with respect to a line (d1) extending from the rotation axis (21) to a substantially central region of the armature winding (7) in a direction opposite to a rotation direction (R) of the field element (2) which is defined based on the armature (3).

A twenty-fifth aspect of the motor according to the present invention is the twenty-third embodiment of the motor which further includes drive means for supplying either rectangular-wave or sinusoidal drive current to the armature winding (7) based on an output of the position detection sensor (6).

A twenty-sixth aspect of the motor according to the present invention is the first embodiment of the motor which further includes: means for detecting an induced voltage of the armature winding (7); means for estimating a position of a magnetic pole of the magnetic-field creating magnet (5) from the induced voltage; and drive means for supplying a drive current based on the estimated position of the magnetic pole of the magnetic-field creating magnet (5) to the armature winding (7).

A twenty-seventh aspect of the motor according to the present invention is the twenty-sixth embodiment of the motor in which the drive means sets a phase of the drive current forward to a phase of the induced voltage.

A twenty-eighth aspect of the motor according to the present invention includes: an armature (3) including an armature winding (7) and a first yoke plate (31) which are stacked in one direction (L); and a field element (2) which includes a magnetic-field creating magnet (5) having magnetic poles which are laid side by side in the one direction and are different from each other in polarity, and is rotatable relative to the armature on a rotation axis (21) extending in the one direction (L). The first yoke plate (31) includes a non-conductive part (241, 242) extending in a rotation direction (R) of the field element (2).

A twenty-ninth aspect of the motor according to the present invention is the twenty-eighth embodiment of the motor in which the non-conductive part (241, 242) includes a plurality of slits (241) which are arranged along a circle centered on the rotation axis (21).

A thirtieth aspect of the motor according to the present invention is the twenty-ninth embodiment of the motor in which the plurality of slits (241) are arranged such that at least one of the plurality of slits (241) is present in a position at every angle along the rotation direction (R) in a range between the rotation axis (21) and a periphery of the first yoke plate (31).

A thirty-first aspect of the motor according to the present invention is the twenty-eighth embodiment of the motor in which the first yoke plate (31) includes a plurality of magnetic plates (31a, 31b, 31c, 31d) having a boundary extending along at least one circle centered on the rotation axis (21), and the non-conductive part (241, 242) includes the boundary (242) between the plurality of magnetic plates.

A thirty-second aspect of the motor according to the present invention is the thirty-first embodiment of the motor in which an insulating coating is provided on the boundary (242) between the plurality of magnetic plates.

A thirty-third aspect of the motor according to the present invention is the twenty-eighth embodiment of the motor in which the armature winding (7) and the magnetic-field creating magnet (5) overlap each other in a direction (D) extending from the rotation axis (21) toward a periphery of the first yoke plate (31).

A thirty-fourth aspect of the motor according to the present invention is the thirty-third embodiment of the motor in which the magnetic-field creating magnet (5) includes a plurality of subsidiary magnets (52) each having magnetic poles which are laid side by side in the one direction and are different from each other in polarity, the plurality of subsidiary magnets (52) are arranged such that different polarities are alternately provided around the rotation axis (21) and a boundary between the different polarities extends in the direction extending toward the periphery, the field element (2) includes: a second yoke plate (2) which includes a first portion (41a) facing the armature winding (7) in the one direction (L) and a second portion (41b) connected to one side of the magnetic-field creating magnet (5) which is opposite to a side on which the armature is placed, and is placed orthogonally to the rotation axis (21); and a third yoke plate (59) which joins the different polarities provided on the side of the magnetic-field creating magnet (5) on which the armature is placed, and the second yoke plate (4) includes a non-magnetic part (46) extending in the direction (D) extending toward the periphery on a boundary between the plurality of subsidiary magnets (52).

A first embodiment of a blower according to the present invention includes the motor according to any of the first through thirty-fourth embodiments and a fan (91) which is rotated by the motor.

A first embodiment of a compressor according to the present invention includes the motor according to any of the first through thirty-fourth embodiments and a compressing mechanism (96) which is rotated by the motor.

A first embodiment of an air conditioner according to the present invention includes the motor according to any of the first through thirty-fourth embodiments and a rotation driving mechanism which is rotated by the motor.

In accordance with the first through twenty-seventh embodiments of the motor according to the present invention, when a predetermined current is flown through the armature winding, the armature and the field element rotate relative to each other on the rotation axis. To employ the armature and the field element as a stator and a rotor, respectively, for example, could cause the motor to function as a brushless DC motor. As the magnetic-field creating magnet and the armature winding do not face each other in a direction parallel to the rotation axis but locally face each other in the second direction perpendicular to the rotation axis, a thickness parallel to the rotation axis can be reduced. As a result, thinning of the motor is possible. Further, reluctance torque caused by attraction of the first yoke plates to the armature can be utilized, so that the torque of the motor can be increased.

In accordance with the second embodiment of the motor according to the present invention, it is possible to improve the strength of the field element and simplify manufacturing processes while preventing a short circuit of a magnetic flux in the first yoke plates.

In accordance with the third embodiment of the motor according to the present invention, it is possible to improve the strength of the field element and simplify manufacturing processes while preventing a short circuit of a magnetic flux in the first yoke plates.

In accordance with the fourth embodiment of the motor according to the present invention, it is possible to generate uniform magnetic reluctance in the second direction on a boundary between portions which are magnetized to have different magnetic poles in the first yoke plates. As a result, it is possible to effectively prevent a short circuit of a magnetic flux in the first yoke plates.

In accordance with the fifth embodiment of the motor according to the present invention, an interval between the adjacent first yoke plates increases as a distance from the rotation axis increases, so that an amount of overlap between magnetized portions in the first yoke plates and the armature winding can be adjusted at a time of rotation. Accordingly, by making an amount of magnetic fluxes which link the armature winding sinusoidal, cogging can be reduced. As a result, it is possible to improve the efficiency of the motor and reduce noises. Also, in accordance with the sixth embodiment of the motor according to the present invention, the foregoing effects can be further enhanced.

In accordance with the seventh embodiment of the motor according to the present invention, a large surface area of the magnetic-field creating magnet which extends in the axial direction is allowed because the magnetic-field creating magnet is in the shape of a ring. As a result, a magnetic flux of the magnetic-field creating magnet can be effectively used, to thereby improve the torque and the efficiency of the motor.

In accordance with the eighth embodiment of the motor according to the present invention, it is possible to easily form a U-shaped magnetic path which opens to the first yoke plates, to thereby reduce magnetic reluctance.

In accordance with the ninth embodiment of the motor according to the present invention, the magnetic-field creating magnet includes a plurality of permanent magnets each having the shape of a hexahedron, so that manufacturing costs for the magnetic-field creating magnet can be reduced.

In accordance with the tenth embodiment of the motor according to the present invention, by employing a bonded magnet as the permanent magnet, it is possible to form a thin magnetic-field creating magnet at low costs, to thereby reduce manufacturing costs.

In accordance with the eleventh embodiment of the motor according to the present invention, the permanent magnet is formed integrally with either the first yoke plates or the second yoke plate by injection molding, to thereby facilitate manufacture and reduce manufacturing costs.

In accordance with the twelfth embodiment of the motor according to the present invention, it is possible to prevent saturation of a magnetic flux in the second yoke plate, to thereby improve the torque and the efficiency of the motor.

In accordance with the thirteenth embodiment of the motor according to the present invention, it is possible to prevent saturation of a magnetic flux in the second yoke plate, to thereby improve the torque and the efficiency of the motor.

In accordance with the fourteenth embodiment of the motor according to the present invention, it is possible to prevent saturation of a magnetic flux in the second yoke plate, to thereby improve the torque and the efficiency of the motor.

In accordance with the fifteenth embodiment of the motor according to the present invention, placement of the armature winding and wiring to the armature winding can be easily accomplished because the armature winding is placed on the substrate. This reduces manufacturing costs.

In accordance with the sixteenth embodiment of the motor according to the present invention, it is possible to flexibly arrange a plurality of armature windings.

In accordance with the seventeenth embodiment of the motor according to the present invention, the armature windings placed on opposite surfaces of the substrate are misaligned with each other in the rotation direction of the field element which is defined based on the armature, so that a skew is formed for the armature winding of the armature in effect. Accordingly, pulsation of torque can be prevented, resulting in improvement of the efficiency of the motor and reduction of noises.

In accordance with the eighteenth embodiment of the motor according to the present invention, the armature winding is formed of a flat coil, which allows the armature winding and the substrate to be formed integrally with each other. Thus, thinning of the motor is possible.

In accordance with the nineteenth embodiment of the motor according to the present invention, the plurality of motor sets are connected while being centered on the rotation axis in common, to thereby increase torque.

In accordance with the twentieth embodiment of the motor according to the present invention, respective armature windings of the plurality of motor sets are misaligned with one another in the rotation direction of the field element, so that a skew is formed for the armature windings of the armatures in effect. Accordingly, pulsation of torque can be prevented, resulting in improvement of the efficiency of the motor and reduction of noises.

In accordance with the twenty-first embodiment of the motor according to the present invention, it is possible to allow two field elements to rotate relative to one armature. As a result, thinning of the motor and increase of torque are possible.

In accordance with the twenty-second embodiment of the motor according to the present invention, a small air gap is allowed, so that magnetic reluctance in a magnetic path is reduced, to thereby improve the efficiency of the motor.

In accordance with the twenty-fourth embodiment of the motor according to the present invention, the position detection sensor is displaced in a direction opposite to the rotation direction, so that phase lag of a current behind a voltage under the influence of inductance of the coil can be avoided. Also, reluctance torque can be effectively used, to thereby improve the torque and the efficiency of the motor.

In accordance with the twenty-fifth embodiment of the motor according to the present invention, in a case where a rectangular-wave drive current is supplied, a structure of the drive means can be simplified. On the other hand, in a case where a sinusoidal drive current is supplied, noises can be reduced.

In accordance with the twenty-sixth embodiment of the motor according to the present invention, there is no need of providing a position detection sensor such as a Hall effect device, so that further thinning of the motor is possible.

In accordance with the twenty-seventh embodiment of the motor according to the present invention, the phase of the drive current is set forward to the phase of the induced voltage, so that phase lag of a current behind a voltage under the influence of inductance of a coil can be avoided. Also, reluctance torque can be effectively used, to thereby improve the torque and the efficiency of the motor.

In accordance with the twenty-eighth through thirty-fourth embodiments of the motor according to the present invention, when the magnetic-field creating magnet functions as a magnetic field and a predetermined current is flown through the armature winding, the armature and the field element can rotate relative to each other. To employ the armature and the field element as a stator and a rotor, respectively, for example, could cause the motor according to the twenty-eighth through thirty-fourth embodiments of the present invention to function as a brushless DC motor. At that time, an induced eddy current occurs in a radial direction extending from the rotation axis toward a periphery of the first yoke plate, or a direction opposite to the radial direction, in the first yoke plate. However, the non-conductive part included in the first yoke plate extends orthogonally to the radial direction, so that occurrence of an eddy current can be suppressed. As a result, the efficiency of the motor is improved.

In accordance with the twenty-ninth embodiment of the motor according to the present invention, as the non-conductive part is a slit, processes for formation thereof are simple, to thereby save manufacturing costs.

In accordance with the thirtieth embodiment of the motor according to the present invention, the non-conductive part is certainly present somewhere in the radial direction in a range between the rotation axis and the periphery of the first yoke plate, so that occurrence of an eddy current can be effectively suppressed. Also, a high strength versus deformation of the first yoke plate at a time of forming the slit can be maintained.

In accordance with the thirty-first embodiment of the motor according to the present invention, the non-conductive part with an extremely small width extending in the radial direction can be formed.

In accordance with the thirty-second embodiment of the motor according to the present invention, it is possible to effectively suppress an eddy current.

In accordance with the thirty-third embodiment of the motor according to the present invention, the magnetic-field creating magnet and the armature winding are placed such that the magnetic-field creating magnet and the armature winding overlap each other in the radial direction, so that a thickness parallel to a rotation axis can be reduced. As a result, thinning of the motor is possible.

In accordance with the thirty-fourth embodiment of the motor according to the present invention, also reluctance torque caused by attraction of the second yoke plate to the armature winding can be utilized, to thereby increase the torque of the motor.

In accordance with the first embodiment of the blower according to the present invention, it is possible to provide a compact and power-saving blower because of inclusion of a motor which is thin and yields high torque.

In accordance with the first embodiment of the compressor according to the present invention, it is possible to provide a compact and power-saving compressor because of inclusion of a motor which is thin and yields high torque.

In accordance with the first embodiment of the air conditioner according to the present invention, it is possible to provide a compact and power-saving air conditioner because of inclusion of a motor which is thin and yields high torque.

These and other objects, features, aspects and advantages of the present invention will become more apparent from the following detailed description of the present invention when taken in conjunction with the accompanying drawings.

DETAILED DESCRIPTION OF THE INVENTION

Below, preferred embodiments of the present invention will be described with reference to accompanying drawings.

A. FIRST PREFERRED EMBODIMENT

Figure 1:
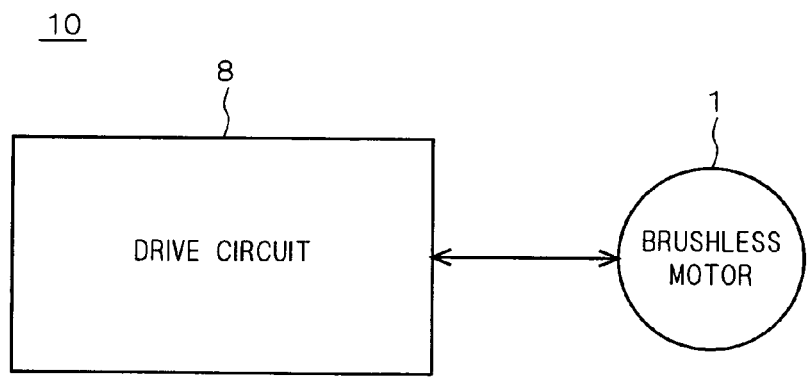
FIG. 1 is a diagrammatic view illustrating a basic structure of a drive system.

FIG. 1 is a diagrammatic view illustrating a basic structure of a drive system 10 according to a first preferred embodiment. As illustrated in FIG. 1, the drive system 10 includes a brushless motor 1 which makes rotational movement and a drive circuit 8 which supplies a drive current to the brushless motor 1. Below, the brushless motor 1 and the drive circuit 8 of the drive system 10 will be described in order of mention.

<A-1. Brushless Motor>

Figure 2:
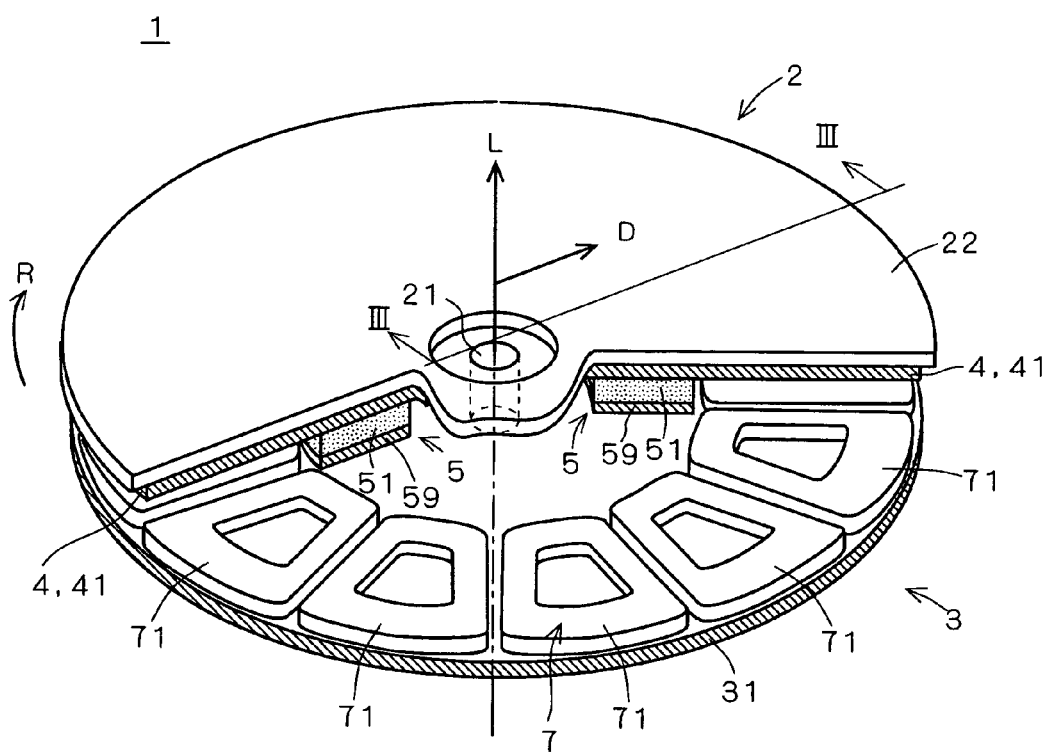
FIG. 2 is a perspective view illustrating one example of a structure of a brushless motor.
Figure 3:
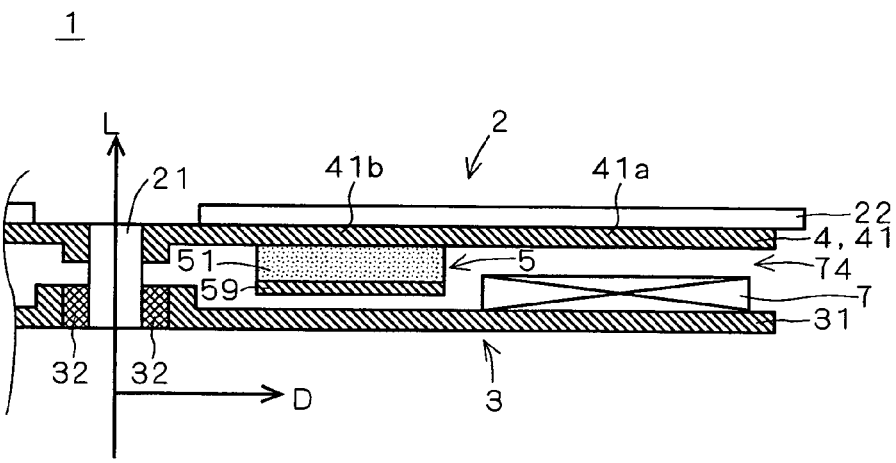
FIG. 3 is a sectional view illustrating one example of a structure of a brushless motor.

FIGS. 2 and 3 illustrate principal components of the brushless motor 1. FIG. 2 is a perspective view and FIG. 3 is a sectional view taken along a line III-III in FIG. 2. As illustrated in FIGS. 2 and 3, the brushless motor 1 is designed to have the shape of a flat plate, and includes a stator 3 and a rotor 2 which are rotatable relative to each other on a rotation axis 21, as principal components. FIG. 2 includes a cutaway view illustrating a portion of the rotor 2 in order to facilitate visual recognition of a structure.

In the following description, a direction L parallel to the rotation axis 21 will be referred to as an "axial direction". Then, it is assumed that a side on which the rotor 2 is placed relative to the stator 3 is a "positive side" in the axial direction L and a side opposite to a positive side is a "negative side". Also, a direction D which is perpendicular to the axial direction L and extends from the rotation axis 21 toward a periphery will be referred to as a "radial direction", and a direction R in which the rotor 2 rotates relative to the stator 3 will be referred to as a "rotation direction". FIG. 2 illustrates an example in which the rotation direction R corresponds to a clockwise direction when viewed from a positive side in the axial direction L.

The stator 3 includes an armature winding 7 and a stator yoke plate 31 which are stacked in the axial direction L in order of mention when viewed from a positive side.

The stator yoke plate 31 is formed of a disc-shaped magnetic material, and a bearing 32 is formed in a center of the disc. The rotation axis 21 is fitted in the bearing 32. As a result, the rotation axis 21 is supported rotatably relative to the stator 3 and a flat portion of the stator yoke plate 31 is placed orthogonally to the axial direction L. The armature winding 7 includes a plurality of coils 71 arranged along a circle which is centered on the rotation axis 21 and is distant from the rotation axis 21. The armature winding 7 is placed on a positive side in the axial direction L with respect to the stator yoke plate 31, to face the rotor 2.

The rotor 2 includes a stiffening part 22, a rotor yoke plate 4, and a magnetic-field creating magnet 5 which are stacked in the axial direction L in order of mention when viewed from a positive side. The rotor yoke plate 4 is disc-shaped and is secured to the rotation axis 21 such that a flat portion thereof is orthogonal to the axial direction L. The stiffening part 22 and the magnetic-field creating magnet 5 are adhered to a positive-side surface of the rotor yoke plate 4 and a negative-side surface of the rotor yoke plate, respectively. The stiffening part 22 is disc-shaped and placed such that a center of the disc corresponds to the center of the rotation axis 21. Additionally, the stiffening part 22 is provided in order to stiffen the rotor yoke plate 4, and thus can be omitted if the rotor yoke plate 4 has sufficient strength.

Also, the magnetic-field creating magnet 5 has the shape of a ring (the shape of a disc including a circular opening in a central region thereof), and is placed such that a center of the disc corresponds to the center of the rotation axis 21. A distance from the center of the rotation axis 21 to a periphery of the magnetic-field creating magnet 5 (outer radius of the magnetic-field creating magnet 5) is set to be smaller than the minimum distance from the center of the rotation axis 21 to the armature winding 7. Further, the magnetic-field creating magnet 5 is placed close to an axial center of the armature winding 7 (close to the rotation axis 21) so that the magnetic-field creating magnet 5 does not face the armature winding 7 in the axial direction L, but at least locally faces the armature winding 7 in the radial direction D. As a result of such arrangement of the magnetic-field creating magnet 5 and the armature winding 7 which overlap each other in the radial direction D, a thickness of the brushless motor 1 which extends in the axial direction L can be reduced, to thereby achieve thinning of the brushless motor 1.

Figure 4:
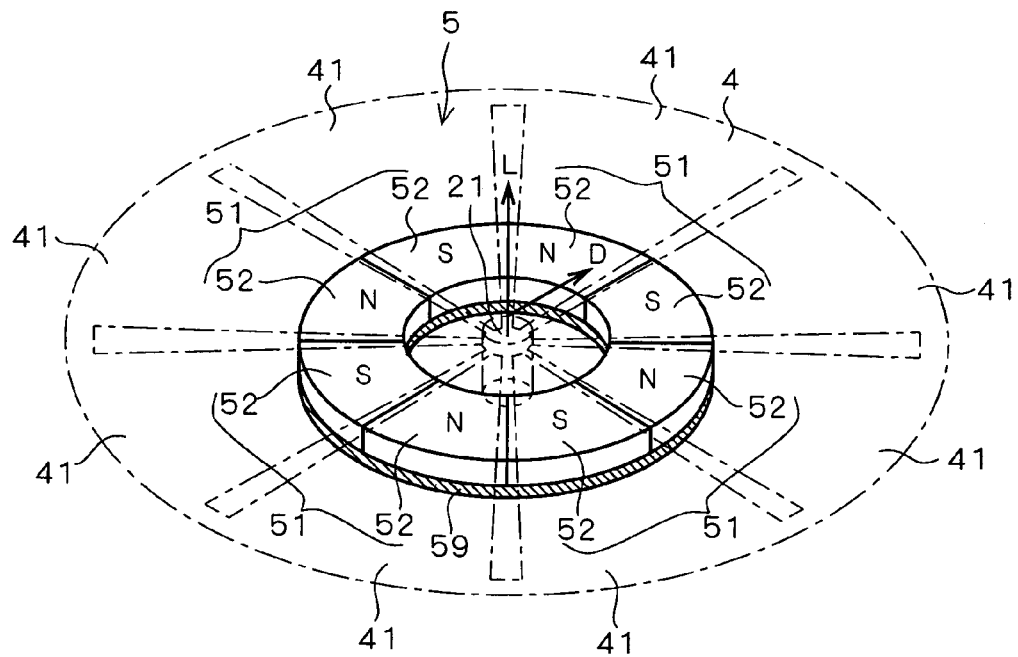
FIG. 4 is a perspective view illustrating one example of a structure of a magnetic-field creating magnet.

The magnetic-field creating magnet 5 includes a plurality of permanent magnets 51 and a short-circuit yoke plate 59. FIG. 4 is a perspective view illustrating a structure of the magnetic-field creating magnet 5. As illustrated in FIG. 4, the magnetic-field creating magnet 5 according to the first preferred embodiment includes four permanent magnets 51. The four permanent magnets 51 are arranged along one circle which is centered on the rotation axis 21, to form the shape of a single ring.

Each of the permanent magnets 51 is partitioned along the radial direction D into two subsidiary magnets 52 of the same size. Each of the two subsidiary magnets 52 has magnetic poles which are arranged in the axial direction L and are different from each other in polarity. Then, respective polar directions parallel to the axial direction L of the two subsidiary magnets 52 included in one permanent magnet 51 are different from each other. Thus, in one permanent magnet 51, the north pole and the south pole are laid side by side when viewed from one of opposite sides in the axial direction L. The foregoing plurality of subsidiary magnets 52 are arranged along one circle centered on the rotation axis 21, to form the magnetic-field creating magnet 5 which is ring-shaped.

The four permanent magnets 51 are arranged such that the subsidiary magnet 52 of one of the four permanent magnets 51 and the subsidiary magnet 52 of another of the four permanent magnets 51 which are placed adjacent to each other are different from each other in polarity. Accordingly, as illustrated in FIG. 4, the subsidiary magnet 52 indicating the north pole and the subsidiary magnet 52 indicating the south pole are alternately placed when viewed from one of opposite sides in the axial direction L. Each of boundaries between the subsidiary magnets 52 (namely, each of boundaries between different polarities in the magnetic-field creating magnet 5) extends in the radial direction D. In short, the plurality of subsidiary magnets 52 are arranged such that one magnetic pole and another magnetic pole different to the one magnetic pole alternate along a circumference of the rotation axis 21 and each of boundaries between the different polarities extends in the radial direction D. Additionally, though the four permanent magnets 51 are used in the magnetic-field creating magnet 5 according to the first preferred embodiment, it is sufficient that at least one permanent magnet 51 (a pair of subsidiary magnets 52 which are different from each other in polar direction parallel to the axial direction L) is provided.

The short-circuit yoke plate 59 is formed of a magnetic material in the shape of a ring having an inside diameter and an outside diameter which are identical to those of the ring shaped by the four permanent magnets 51. The short-circuit yoke plate 59 is adhered to surfaces of the four permanent magnets 51, which surfaces are located on a negative side in the axial direction L, and joins the north pole and the south pole of the magnetic-field creating magnet 5. Specifically, the short-circuit yoke plate 59 joins the north pole of one of adjacent subsidiary magnets 52 and the south pole of the other, to magnetically short-circuit those poles, on a negative side in the axial direction L.

Figure 5:
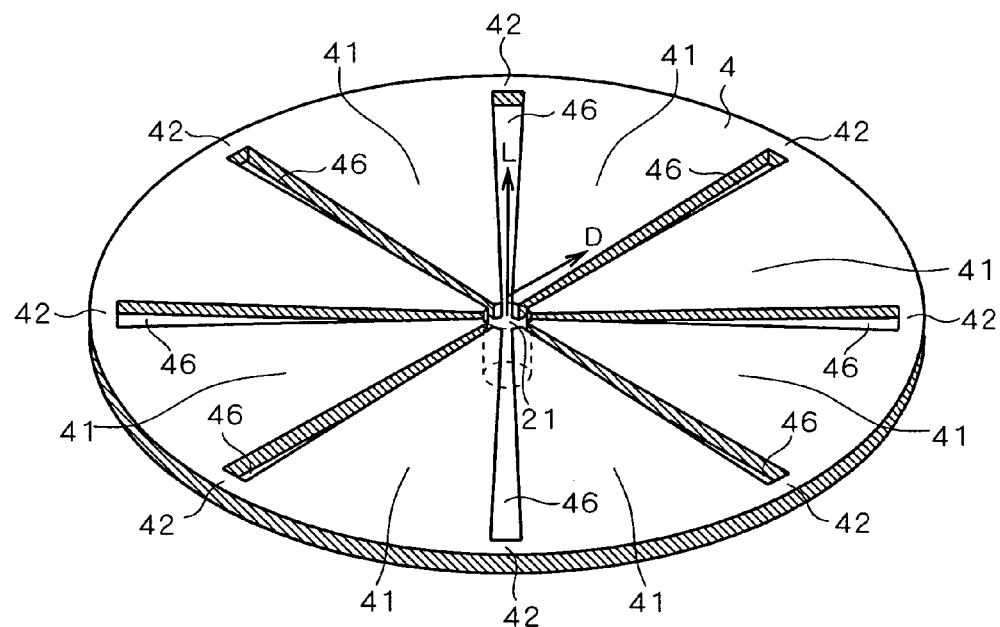
FIG. 5 is a perspective view illustrating one example of a structure of a rotor yoke plate.
Figure 6:
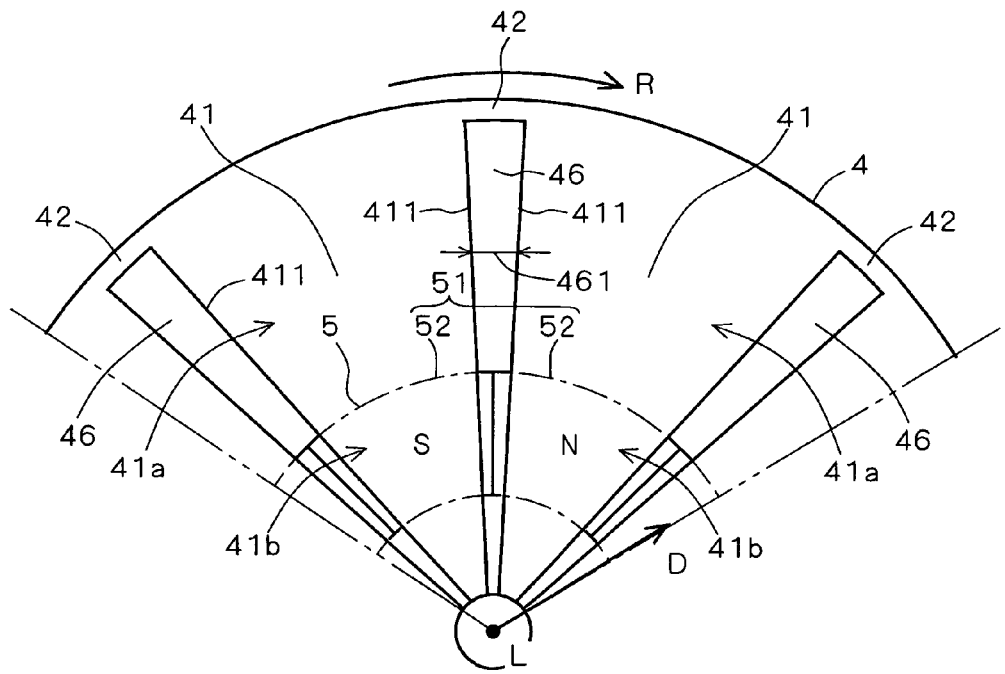
FIG. 6 is a view illustrating one example of a structure of a rotor yoke plate.

The rotor yoke plate 4 placed on a positive side in the axial direction L with respect to the magnetic-field creating magnet 5 includes a plurality of magnetic materials which form the shape of a disc as a whole. FIGS. 5 and 6 illustrate a structure of the rotor yoke plate 4. FIG. 5 is a perspective view of the rotor yoke plate 4 and the FIG. 6 illustrates a portion of the rotor yoke plate 4 when viewed from a positive side in the axial direction L.

As illustrated in FIGS. 5 and 6, the rotor yoke plate 4 includes eight slits 46 each of which serves as a non-magnetic part extending from the rotation axis 21 in the radial direction D. The slits 46 are formed at 45-degree intervals to radiate from the center of the rotation axis 21. The rotor yoke plate 4 is partitioned into eight subsidiary yoke plates 41 each of which is substantially fan-shaped, by the slits 46.

Each of the subsidiary yoke plates 41 includes a first flat portion 41a which faces the armature winding 7 in the axial direction L to form an air gap 74, and a second flat portion 41b which does not face the armature winding 7 in the axial direction L (refer to FIG. 3). The first flat portion 41a and the second flat portion 41b are placed to extend in the same radial direction D. Respective end portions of the first flat portions 41a on a side of peripheries (a side opposite to the rotation axis 21) of adjacent subsidiary yoke plates 41 are connected to each other by a joint 42 in order to maintain the strength of the rotor yoke plate 4. Also, as illustrated in FIG. 6, a width 461 of each of the slits 46 which corresponds to an interval between adjacent subsidiary yoke plates 41 increases as a distance from the rotation axis 21 in the radial direction D increases.

The number of the subsidiary yoke plates 41 is set to be equal to the number of polarities on one of opposite sides in the axial direction L (=the number of the subsidiary magnets 52) in the magnetic-field creating magnet 5. Then, the rotor yoke plate 4 and the magnetic-field creating magnet 5 are joined to each other such that each of the subsidiary yoke plates 41 is in contact with only one polarity. In FIG. 4, a positional relationship between the rotor yoke plate 4 and the magnetic-field creating magnet 5 is represented by illustrating a surface of the rotor yoke plate 4 which is located on a negative side in the axial direction L, using a dashed line. As illustrated in FIGS. 4 and 6, each of the subsidiary yoke plates 41 is joined to only one subsidiary magnet 52 (i.e., one polarity) at the second flat portion 41b thereof. Accordingly, the second flat portion 41b of one of adjacent subsidiary yoke plates 41 is joined to the north pole while the second flat portion 41b of the other of the adjacent subsidiary yoke plates 41 is joined to the south pole. Further, the eight slits 46 are placed along boundaries between the polarities in the magnetic-field creating magnet 5, respectively.

The above-described structure of the rotor 2 can be manufactured at relatively low costs by employing a bonded magnet for the permanent magnet 51. More specifically, to employ a bonded magnet for the permanent magnet 51 makes it possible to easily form a thin permanent magnet. Also, to form a bonded magnet as the permanent magnet 51 integrally with either the rotor yoke plate 4 or the short-circuit yoke plate 59 by injection molding would facilitate manufacture. As a result, it is possible to manufacture the brushless motor 1 at low costs.

Then, to flow a predetermined drive current to the armature winding 7 of the brushless motor 1 having the above-described structure from the drive circuit 8 (FIG. 1) causes generation of a magnetic pole for rotation in each of the coils 71 of the armature winding 7, so that the rotor 2 makes rotational movement relative to the stator 3.

Figure 7:
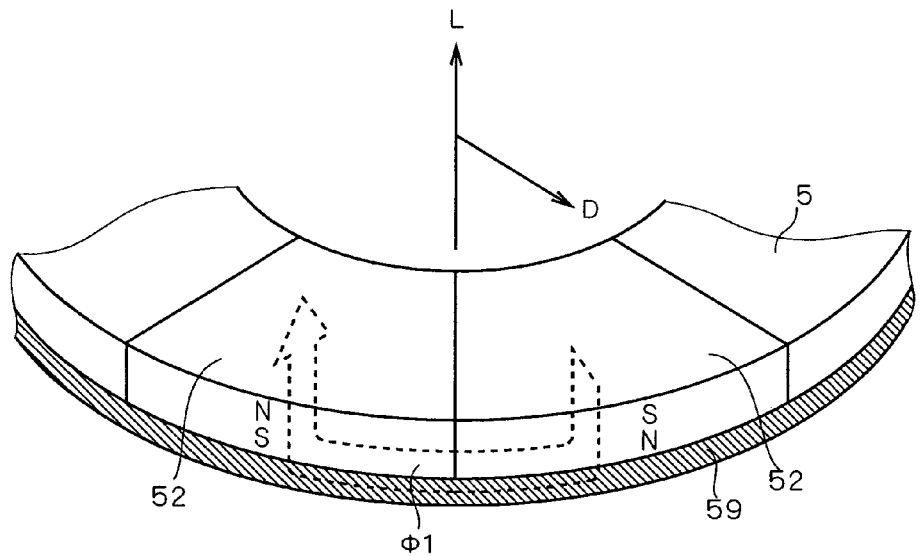
FIG. 7 is a view illustrating a magnetic path formed on a negative side in an axial direction with respect to a magnetic-field creating magnet.
Figure 8:
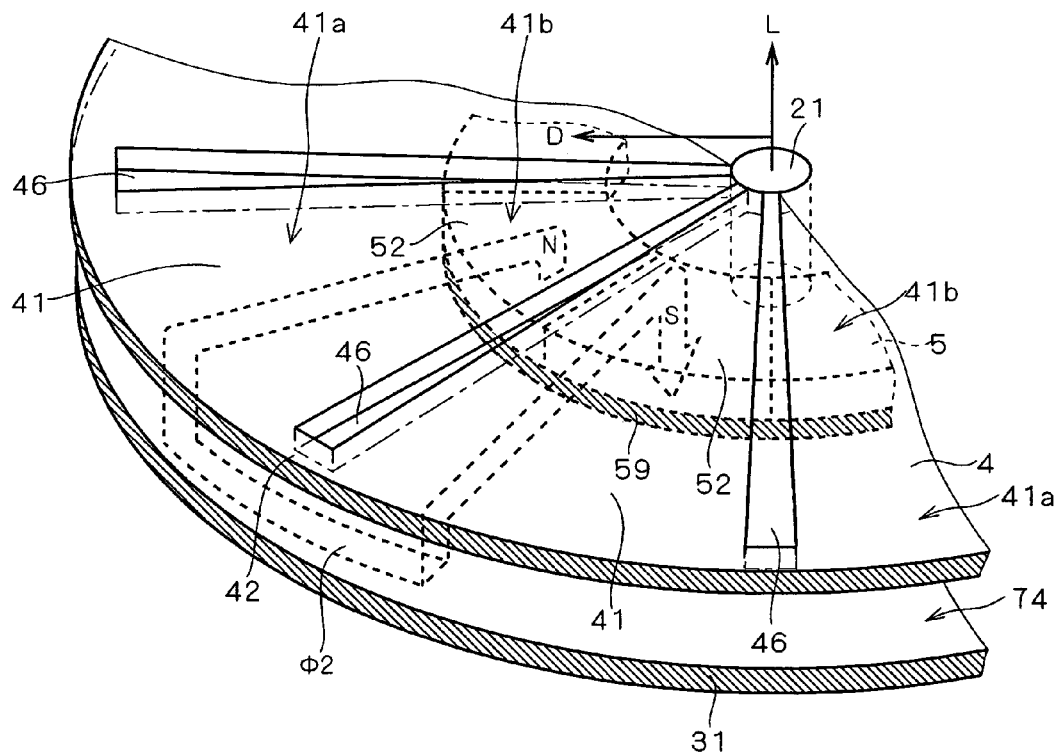
FIG. 8 is a view illustrating a magnetic path formed on a positive side in the axial direction with respect to a magnetic-field creating magnet.

Below, a magnetic path formed in rotational movement of the above-described brushless motor 1 will be described. FIG. 7 is a perspective view illustrating a magnetic path formed on a negative side in the axial direction L with respect to the magnetic-field creating magnet 5. FIG. 8 is a perspective view illustrating a magnetic path formed on a positive side in the axial direction L with respect to the magnetic-field creating magnet 5.

As indicated by a magnetic path $\Phi 1$ in FIG. 7, a magnetic flux starting from the north pole of one subsidiary magnet 52 passes through the short-circuit yoke plate 59, and returns to the south pole of another subsidiary magnet 52 which is placed adjacent to the one subsidiary magnet 52, on a negative side in the axial direction L with respect to the magnetic-field creating magnet 5. It is noted, however, that only a magnetic flux which travels toward the south pole of one of the subsidiary magnets 52 each placed adjacent to the one subsidiary magnet 52 from which the magnetic flux starts is indicated in FIG. 7 for purposes of simplifying explanation. Thus, the magnetic-field creating magnet 5 has a U-shaped magnetic path $\Phi 1$ which opens to the subsidiary yoke plates 41.

On the other hand, on a positive side in the axial direction L with respect to the magnetic-field creating magnet 5, referring to a magnetic path $\Phi 2$ in FIG. 8, a magnetic flux starting from the north pole of one subsidiary magnet 52, first, travels toward the first flat portion 41a of one subsidiary yoke plate 41 which is joined to the one subsidiary magnet 52 via the second flat portion 41b of the one subsidiary yoke plate 41. Next, the magnetic flux which leaves the first flat portion 41a, crosses over the air gap 74 along the axial direction L, and further travels toward the stator yoke plate 31. Subsequently, after passing through the stator yoke plate 31, the magnetic flux again crosses over the air gap 74 along the axial direction L, and further travels toward the first flat portion 41a of another subsidiary yoke plate 41 placed adjacent to the one subsidiary yoke plate 41. Then, the magnetic flux travels toward the second flat portion 41b from the first flat portion 41a of another subsidiary yoke plate 41, and thereafter returns to the south pole of another subsidiary magnet 52 which is placed adjacent to the one subsidiary magnet 52 from which the magnetic flux starts. It is noted, however, that only a magnetic flux which travels toward the south pole of one of the subsidiary magnets 52 each placed adjacent to the one subsidiary magnet 52 from which the magnetic flux starts is indicated in FIG. 8 for purposes of simplifying explanation.

During the foregoing travel of the magnetic flux, each of the slits 46 functions to prevent a short circuit of a magnetic flux between adjacent subsidiary yoke plates 41. There is a possibility that a short circuit of a magnetic flux may occur in the joints 42. Nonetheless, such a possible short circuit of a magnetic flux in the joints 42 is substantially negligible because a sectional area of each of the joints 42 is extremely small and magnetic reluctance becomes high.

As described above, the brushless motor 1 allows for reduction in the width thereof extending in the axial direction L because the magnetic-field creating magnet 5 and the armature winding 7 do not face each other in the axial direction L, but locally face each other in the radial direction D. As a result, thinning of the motor can be achieved.

Also, the U-shaped magnetic path $\Phi 1$ which opens to the subsidiary yoke plates 41 is formed because of provision of the short-circuit yoke plate 59 on a negative side in the axial direction L with respect to the magnetic-field creating magnet 5. This makes it possible to shorten a magnetic path formed on a negative side in the axial direction L with respect to the magnetic-field creating magnet 5, to allow for reduction of magnetic reluctance. As a result, the efficiency of the brushless motor 1 can be improved. Further, for rotational movement, also reluctance torque caused by attraction of the subsidiary yoke plates 41 can be utilized for rotation, to thereby increase the torque of the brushless motor 1.

Moreover, only respective end portions on a side of the peripheries are connected to each other in adjacent subsidiary yoke plates 41. Thus, a short circuit of a magnetic flux between the adjacent subsidiary yoke plates 41 can be prevented, and the strength of the rotor 2 can be improved, to thereby facilitate manufacturing processes.

Furthermore, because of the shape of the magnetic-field creating magnet 5 which is ring-shaped, a large surface area of the magnetic-field creating magnet 5 is allowed. As a result, a magnetic flux of the magnetic-field creating magnet 5 can be effectively utilized, to thereby further improve the torque and the efficiency of the brushless motor 1.

<A-2. Modifications of Brushless Motor>

The structure of the brushless motor 1 according to the first preferred embodiment is not limited to the above-described embodiment (which will hereinafter be referred to as a "representative embodiment"), and various modifications are possible. Below, various modifications each of which is employable for the structure of the brushless motor 1 according to the first preferred embodiment will be described.

<A-2-1. Joint>

Figure 9:
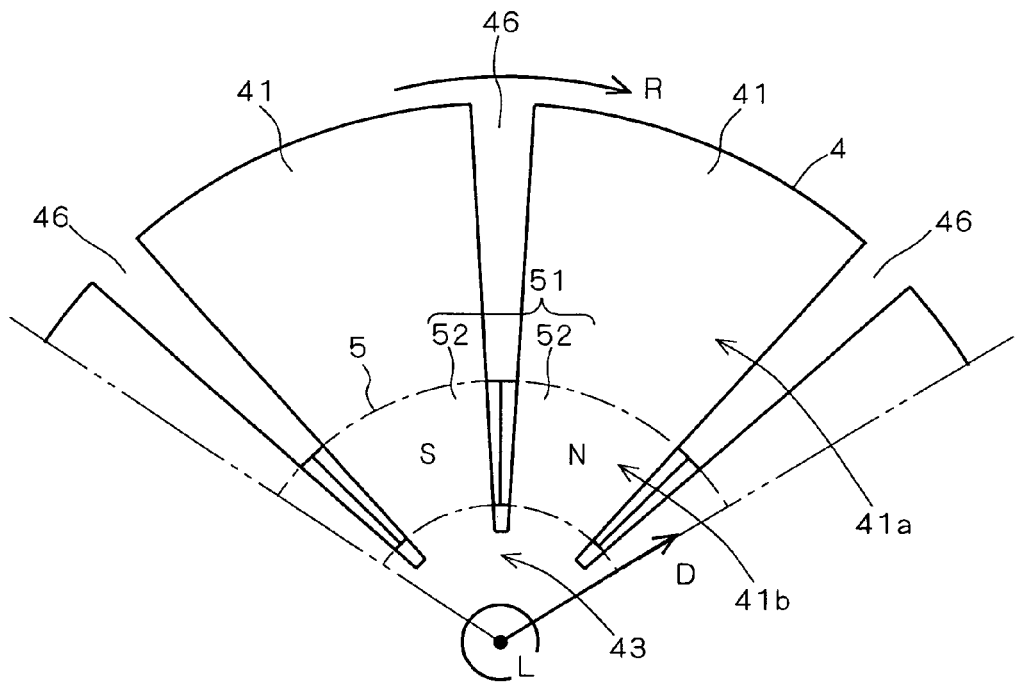
FIG. 9 is a view illustrating one example of a structure of a rotor yoke plate.

Though adjacent subsidiary yoke plates 41 are connected to each other at respective end portions on a side of peripheries thereof as illustrated in FIG. 6 and the like according to the representative embodiment, the adjacent subsidiary yoke plates 41 may be connected to each other at respective end portions on a side of an axial center. FIG. 9 illustrates an example of the rotor yoke plate 4 in this case.

As illustrated in FIG. 9, a joint 43 is formed on a side of an axial center in the subsidiary yoke plates 41 in the present example. As a result of formation of the joint 43, respective end portions on a side of an axial center of adjacent subsidiary yoke plates 41 are connected to each other, and portions of the slits 46 which are located on a side of the peripheries open. The joint 43 does not overlie a boundary between the north pole and the south pole of the permanent magnets 51 in order not to cause a short circuit of a magnetic flux, and is placed closer to an axial center than the permanent magnet 51.

To employ the foregoing structure could improve the strength of the rotor 2, as well as prevent a short circuit of a magnetic flux between the subsidiary yoke plates 41, to thereby facilitate manufacturing processes.

<A-2-2. Slit>

Figure 10:
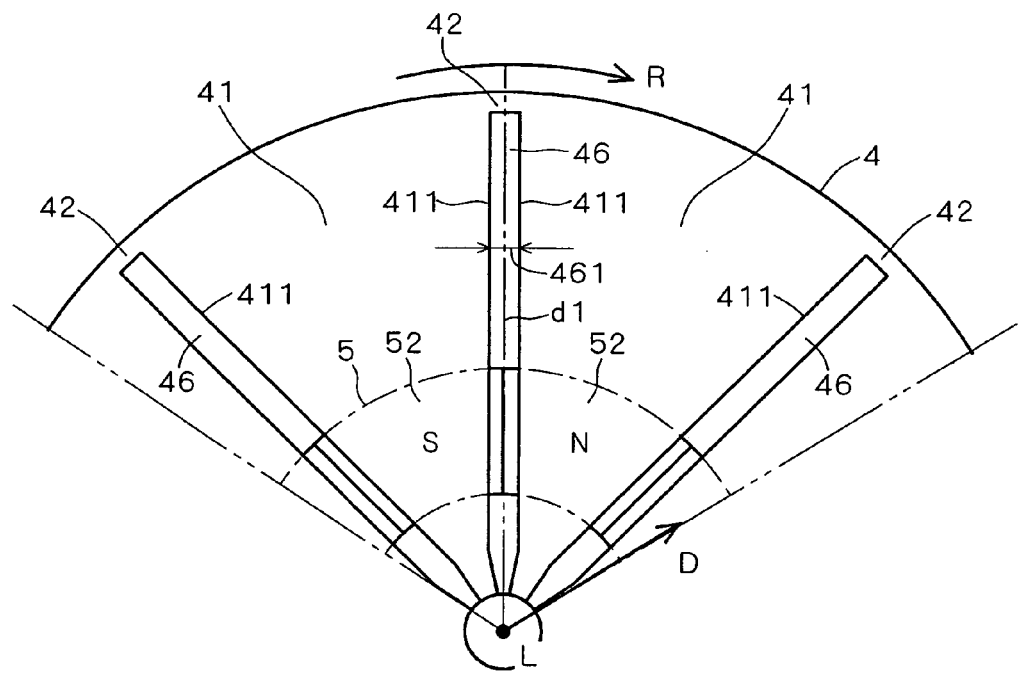
FIG. 10 is a view illustrating one example of a structure of a rotor yoke plate.

Though the width 461 of each of the slits 46 increases as a distance from the rotation axis 21 in the radial direction D increases as illustrated in FIG. 6 according to the representative embodiment, the width 461 may be uniform at all locations in the radial direction D. FIG. 10 illustrates an example of the rotor yoke plate 4 in this case.

As illustrated in FIG. 10, in the present example, the width 461 of each of the slits 46 is uniform at all locations in the radial direction D. This causes an outline 411 of each of the subsidiary yoke plates 41 which serves as a boundary between the subsidiary yoke plate 41 and one of the slits 46 to be parallel to a center line d1 extending along a long axis of the one slit 46 (corresponding to the radial direction D).

To employ the foregoing structure could cause generation of uniform magnetic reluctance in the radial direction D between adjacent subsidiary yoke plates 41 which are magnetized to have different magnetic poles. As a result, it is possible to effectively prevent a short circuit of a magnetic flux between the adjacent subsidiary yoke plates 41.

Figure 11:
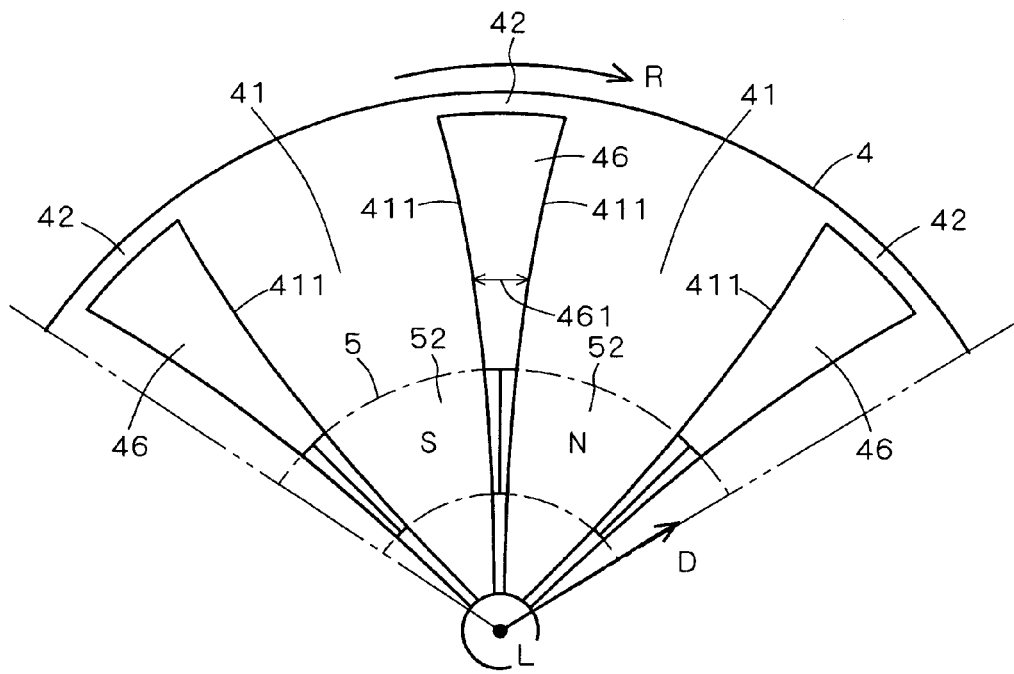
FIG. 11 is a view illustrating one example of a structure of a rotor yoke plate.

Also, as an alternative example, the width 461 of each of the slits 46 may non-linearly increases in proportion to a distance from the rotation axis 21. FIG. 11 illustrates that alternative example of the rotor yoke plate 4. As illustrated in FIG. 11, in the alternative example, the outline 411 of each of the subsidiary yoke plates 41 is curved, and the width 461 of each of the slits 46 non-linearly increases in proportion to a distance from the rotation axis 21.

When the structure in which the width 461 of each of the slits 46 increases as a distance from the rotation axis 21 increases as illustrated in FIGS. 6 and 11 is employed, an amount of overlap between the subsidiary yoke plates 41 and the armature winding 7 in the axial direction L during rotational movement of the brushless motor 1 can be adjusted. For this reason, an amount of magnetic fluxes which link the armature winding 7 can be made sinusoidal, so that cogging can be reduced. As a result, the efficiency of the motor can be improved and noises can be reduced. Further, to employ the structure in which the width 461 of each of the slits 46 non-linearly increases as illustrated in FIG. 11 could further enhance the foregoing effects.

<A-2-3. Permanent Magnet>

Figure 12:
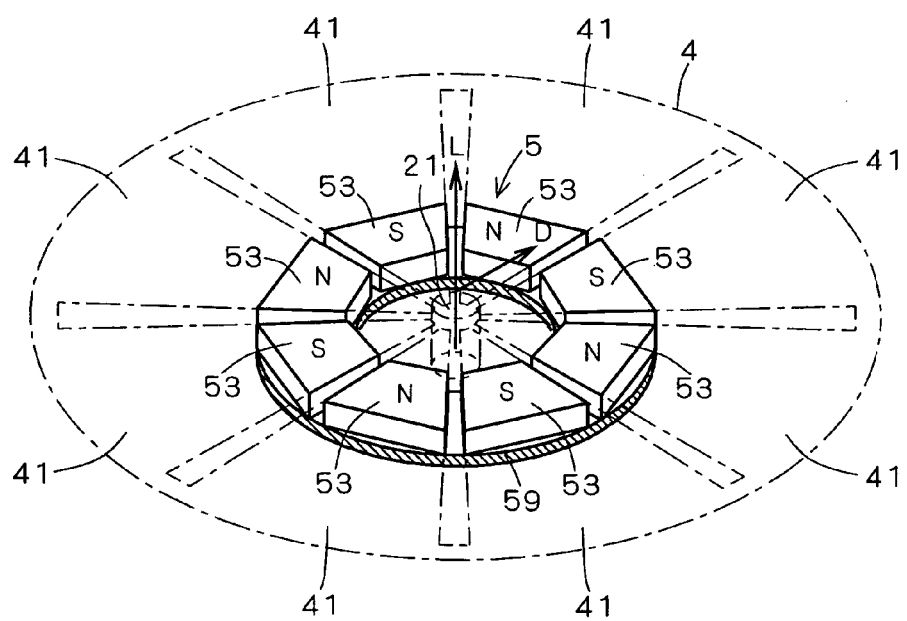
FIG. 12 is a perspective view illustrating one example of a structure of a magnetic-field creating magnet.

According to the representative embodiment, each of the permanent magnets 51 and the subsidiary magnets 52 employed for the magnetic-field creating magnet 5 is in the shape of a part of a ring as illustrated in FIG. 4. In this regard, the shape of a part of a ring is not limited to any specific shape. For example, a permanent magnet 53 in the shape of a hexahedron can be employed as a permanent magnet corresponding to each of the subsidiary magnets 52 in the representative embodiment, as illustrated in FIG. 12. To employ the permanent magnet 53 in the shape of a hexahedron could reduce manufacturing costs for the magnetic-field creating magnet 5.

According to an example illustrated in FIG. 12, eight permanent magnets 53 are placed on a positive side in the axial direction L with respect to the short-circuit yoke plate 59. While being placed in the foregoing manner, each of the permanent magnets 53 has magnetic poles which are arranged in the axial direction L and are different from each other in polarity. Also, the permanent magnet 53 indicating the north pole and the permanent magnet 53 indicating the south pole are alternately placed when viewed from one of opposite sides in the axial direction L, so that the north pole and the south pole of the permanent magnet 53 are laid side by side on one of opposite sides in the axial direction L.

The structure according to the present example is identical to that according to the representative embodiment in the other respects. Specifically, the short-circuit yoke plate 59 joins the north pole of one of adjacent permanent magnets 53 and the south pole of the other permanent magnet 53, to magnetically short-circuit those poles, on a negative side in the axial direction L. Also, each of the subsidiary yoke plates 41 is joined to only one of the permanent magnets 53. Each of the permanent magnets 53 can be formed of a bonded magnet and can be formed integrally with either the rotor yoke plate 4 or the short-circuit yoke plate 59 by injection molding, of course.

Additionally, while the eight permanent magnets 53 are employed for the magnetic-field creating magnet 5 according to the present example, it is sufficient that the magnetic-field creating magnet 5 includes at least two permanent magnets 53 which are placed such that the north pole and the south pole are laid side by side on one of opposite sides in the axial direction L.

<A-2-4. Short-Circuit Yoke Plate>

Figure 13:
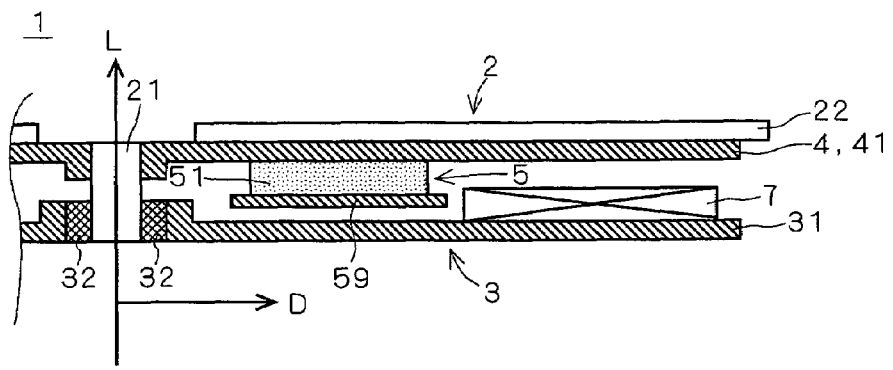
FIG. 13 is a sectional view illustrating one example of a structure of a brushless motor.

According to the representative example, a width of the short-circuit yoke plate 59 which extends in the radial direction D (a difference between an outer radius and an inner radius of the shape of a ring) is equal to a width of each of the permanent magnets 51 which extends in the radial direction D in the magnetic-field creating magnet 5, as illustrated in FIG. 3. To the contrary, the width of the short-circuit yoke plate 59 which extends in the radial direction D may be made larger than the width of the permanent magnet 51 which extends in the radial direction D as illustrated in FIG. 13, for example.

The magnetic path Φ1 runs through a portion of a section of the short-circuit yoke plate 59 which extends along a boundary between the subsidiary magnets 52 (a position where different polarities are adjacent to each other in the permanent magnet 51) on a negative side in the axial direction L with respect to the magnetic-field creating magnet 5, as described above (refer to FIG. 7). Accordingly, if an area of the foregoing portion of the section of the short-circuit yoke plate 59 is too small to allow formation of the magnetic path Φ1 therein, there is a possibility that saturation of magnetic fluxes occurs. In contrast thereto, to employ the structure illustrated in FIG. 13 could increase the area of the foregoing portion of the section of the short-circuit yoke plate 59, to thereby prevent saturation of magnetic fluxes in the short-circuit yoke plate 59, resulting in reduction of magnetic reluctance.

Figure 14:
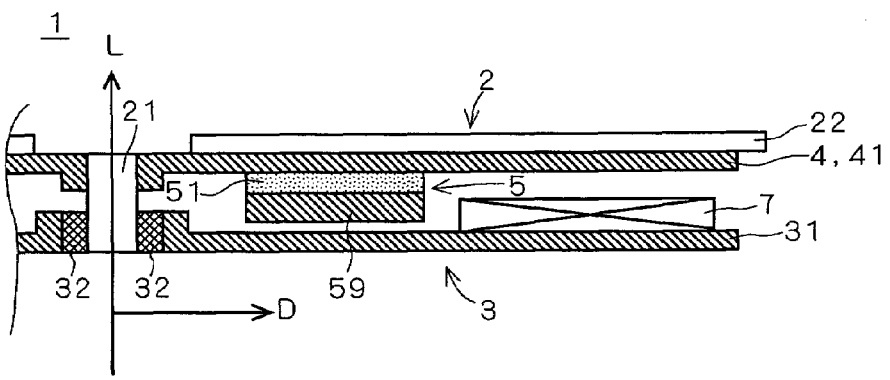
FIG. 14 is a sectional view illustrating one example of a structure of a brushless motor.

Similarly, a width of the short-circuit yoke plate 59 which extends in the axial direction L may be made larger than a width of the permanent magnet 51 which extends in the axial direction L as illustrated in FIG. 14, for example. This also can prevent saturation of magnetic fluxes in the short-circuit yoke plate 59, to thereby reduce magnetic reluctance. Further, the structure illustrated in FIG. 13 and the structure illustrated in FIG. 14 may be combined with each other.

Figure 15:
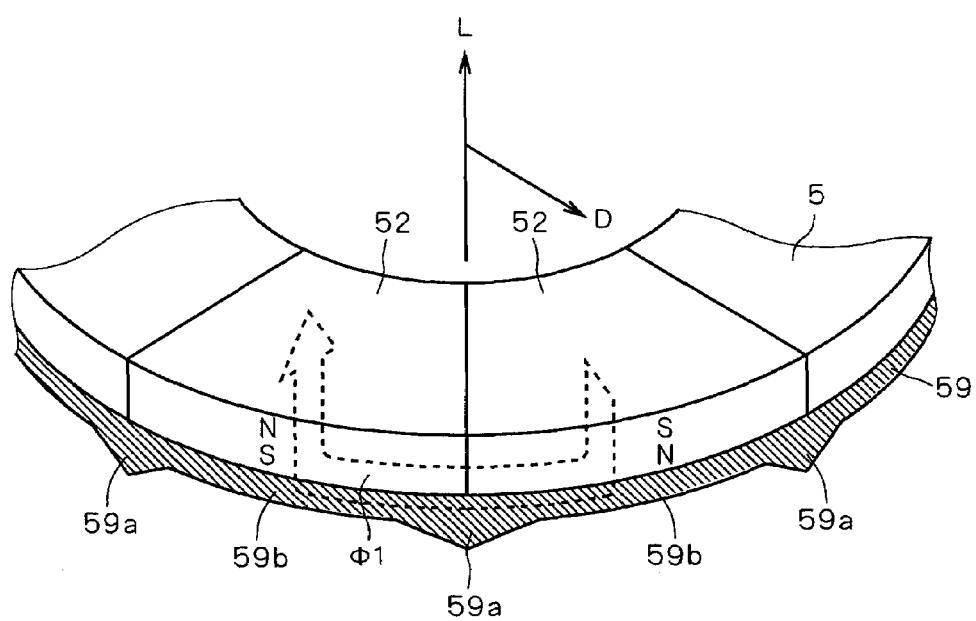
FIG. 15 is a view illustrating one example of a structure of a short-circuit yoke plate.

Moreover, a portion which extends along a boundary between the subsidiary magnets 52 may be designed to have a larger section than the other portions in the short-circuit yoke plate 59. FIG. 15 illustrates an example of the short-circuit yoke plate 59 in this case. As illustrated in FIG. 15, a portion 59a which faces a position where a boundary between the subsidiary magnets 52 is provided has a larger width extending in the axial direction L than the other portion 59b in the short-circuit yoke plate 59. In this manner, it is possible to prevent saturation of magnetic fluxes in the short-circuit yoke plate 59 to reduce magnetic reluctance without significantly increasing a weight of the magnetic-field creating magnet 5.

<A-2-5. Armature Winding>

Figure 16:
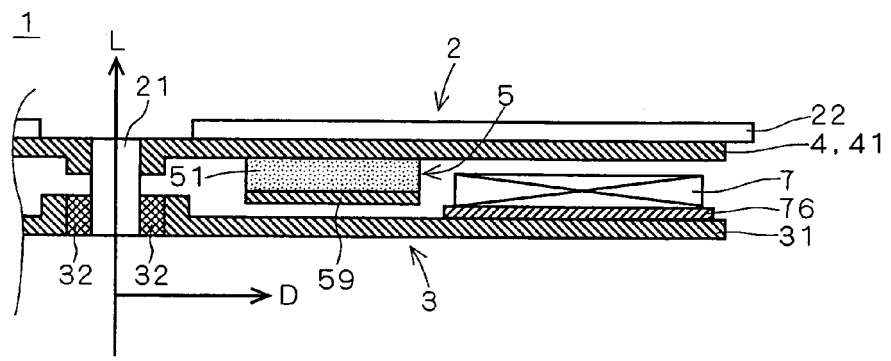
FIG. 16 is a sectional view illustrating one example of a structure of a brushless motor.
Figure 17:
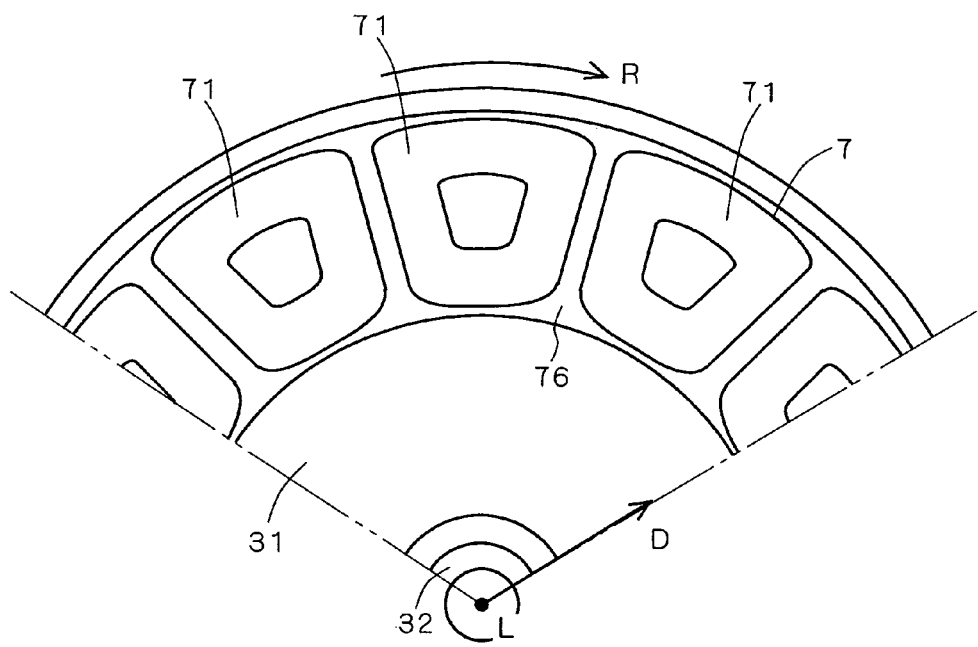
FIG. 17 is a view illustrating how an armature winding is arranged on a surface of a substrate.

The armature winding 7 may be placed on a surface of a substrate 76 as illustrated in FIGS. 16 and 17. Referring to FIGS. 16 and 17, the substrate 76 has the shape of a ring, for example, and is placed on a positive side in the axial direction L with respect to the stator yoke plate 31 such that a center of a disc corresponds to the center of the rotation axis 21. Then, the armature winding 7 is placed on a surface of the substrate 76 which is located on a positive side in the axial direction L. To employ the foregoing structure would facilitate arrangement of the plurality of coils 71 included in the armature winding 7 and wiring to the armature winding 7, to thereby reduce manufacturing costs for the brushless motor 1.

Figure 18:
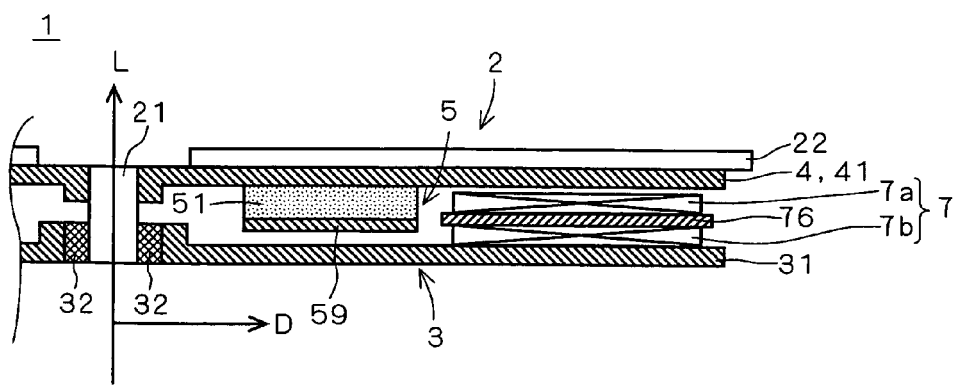
FIG. 18 is a sectional view illustrating one example of a structure of a brushless motor.

Alternatively, the armature winding 7 may be placed on surfaces of one substrate 76, which surfaces are opposite to each other in the axial direction L, as illustrated in FIG. 18. The stator 3 in an example illustrated in FIG. 18 includes a first armature winding 7a, the ring-shaped substrate 76, a second armature winding 7b, and the stator yoke plate 31 which are stacked in the axial direction L in order of mention when viewed from a positive side. To employ the foregoing structure would allow more flexible arrangement of the two-layer armature windings 7.

Figure 19:
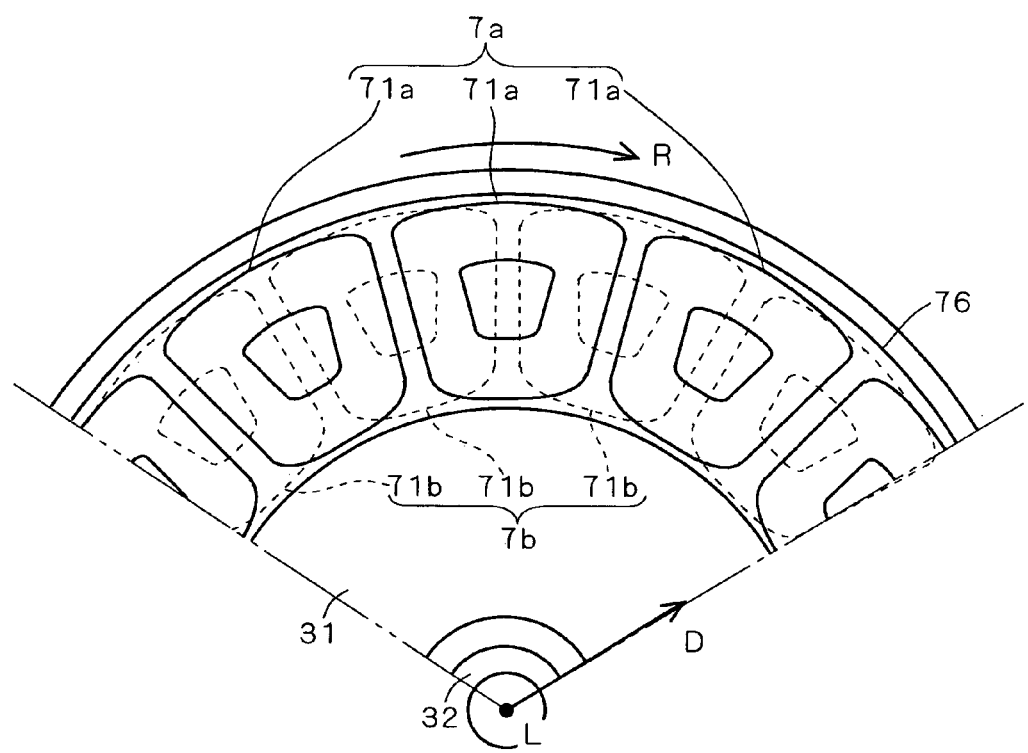
FIG. 19 is a view illustrating how armature windings are arranged on opposite surfaces of a substrate.

For example, coils 71a forming the first armature winding 7a illustrated in FIG. 18 and coils 71b forming the second armature winding 7b illustrated in FIG. 18 can be placed to be misaligned with each other in the rotation direction R (such that respective centers of the coils 71a and respective centers of the coils 71b do not overlap in the radial direction D), as illustrated in FIG. 19. To employ the foregoing structure results in formation of a skew for the armature winding 7 of the stator 3 in effect. Accordingly, pulsation of torque which is likely to occur during rotational movement can be prevented, to thereby improve the efficiency of the motor and reduce noises.

Also, though a coil having a certain width in the axial direction L is illustrated as the coil 71 of the armature winding 7 in the drawings which have been referred to in the description of the representative embodiment, a flat printed coil which is flattened in the axial direction L may be employed. For formation of a printed coil, a conductor is formed by performing a photolithographic process on a substrate, to be integral with the substrate, so that a flat printed coil can be obtained, as disclosed in the Patent Document 4, for example. By forming such a flat printed coil on the substrate 76, the armature winding 7 and the substrate 76 can be integrally formed, to thereby achieve further thinning of the motor.

<A-2-6. Rotor Yoke Plate>

Figure 20:
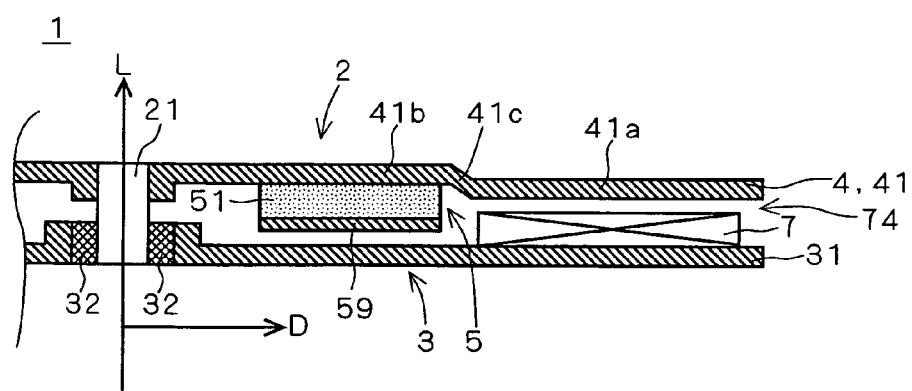
FIG. 20 is a sectional view illustrating one example of a structure of a brushless motor.

According to the representative embodiment, the first flat portion 41a and the second flat portion 41b of each of the subsidiary yoke plates 41 are aligned with each other in the same radial direction D, as illustrated in FIG. 3 and the like. Meanwhile, the first flat portion 41a and the second flat portion 41b of each of the subsidiary yoke plates 41 may be misaligned with each other in the axial direction L. FIG. 20 is a view illustrating an example of the brushless motor 1 in this case.

As illustrated in FIG. 20, while each of the first flat portion 41a and the second flat portion 41b of each of the subsidiary yoke plates 41 extends in the radial direction D according to the example illustrated in FIG. 20, the first flat portion 41a is placed on a negative side (a side on which the armature winding 7 is placed) in the axial direction L, with respect to the second flat portion 41b, and the first flat portion 41a and the second flat portion 41b are connected by a connecting part 41c. To employ the foregoing structure would make it possible to lessen the air gap 74 formed between the first flat portion 41a and the armature winding 7. Accordingly, magnetic reluctance in a magnetic circuit can be reduced, to thereby improve the efficiency of the motor.

<A-2-7. Connection of Motor Sets>

Assuming that one of the above-described stators 3 and one of the above-described rotors 2 are paired to form one motor set, the brushless motor 1 may be formed of a connection of a plurality of motor sets which are centered on the rotation axis 21 in common and connected to one another to be arranged in the axial direction L.

Figure 21:
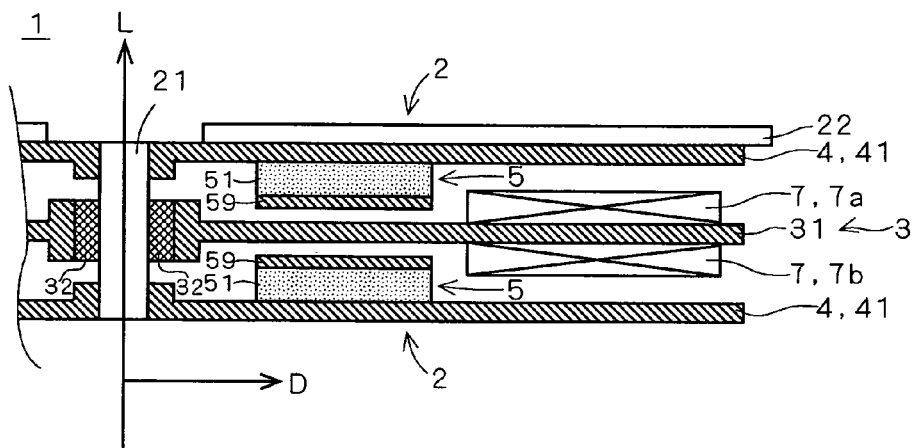
FIG. 21 is a sectional view illustrating one example of a structure of a brushless motor.
Figure 22:
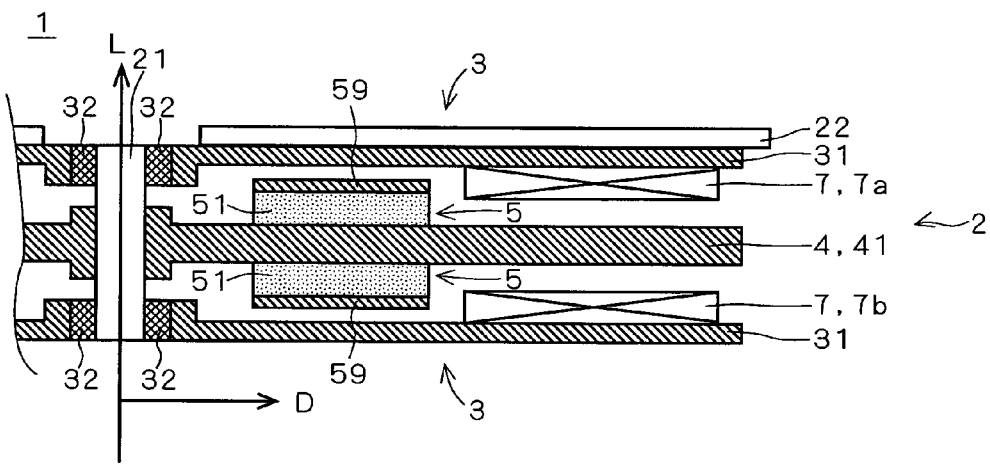
FIG. 22 is a sectional view illustrating one example of a structure of a brushless motor.

FIGS. 21 and 22 illustrate examples of the brushless motor 1 in which two motor sets each of which is similar to that described in FIG. 3 are connected to each other to be arranged in the axial direction L while being centered on the rotation axis 21 in common. In each of the examples of the brushless motor 1 which are illustrated in FIGS. 21 and 22, two motor sets, of which positional relationship in the axial direction L between the rotor 2 and the stator 3 are inverse to each other, are connected to each other.

According to the example illustrated in FIG. 21, respective stators 3 of the two motor sets are joined to each other. On the other hand, according to the example illustrated in FIG. 22, respective rotors 2 of the two motor sets are joined to each other. In each of the examples illustrated in FIGS. 21 and 22, a component which can be shared by the two motor sets is shared by the two motor sets. For example, a single stator yoke plate 31 is shared by the two motor sets in the brushless motor 1 illustrated in FIG. 21, and a single rotor yoke plate 4 is shared by the two motor sets in the brushless motor 1 illustrated in FIG. 22.

In order to cause the foregoing brushless motor 1 to make rotational movement, a drive current is supplied to the armature winding 7 of each of the two motor sets from the drive circuit 8 such that respective rotation directions of the rotors 2 of the two motor sets are identical to each other. As a result, torque of one of the two motor sets and torque of the other are added to each other, so that the torque of the brushless motor 1 as a whole can be increased. Additionally, though two motor sets are connected according to the examples described above, three or more motor sets may be connected.

Also, in a case where the foregoing structure having a plurality of connected motor sets is employed, respective armature windings 7 included in the plurality of motor sets may be misaligned with one another in the rotation direction R. For example, assuming that the armature winding 7 of one of the motor sets which is placed on a positive side is a first armature winding 7a and the armature winding 7 of the other of the motor sets which is placed on a negative side is a second armature winding 7b in the example illustrated in FIG. 21 or 22, coils 71a forming the first armature winding 7a and coils 71b forming the second armature winding 7b are respectively misaligned with each other in the rotation direction R as illustrated in FIG. 19. Also the foregoing structure results in formation of a skew for the armature windings 7 of the stators 3 in effect. Accordingly, pulsation of torque can be prevented, to thereby improve the efficiency of the motor and reduce noises.

<A-2-8. Positional Relationship between Magnetic-Field Creating Magnet and Armature Winding>

Figure 23:
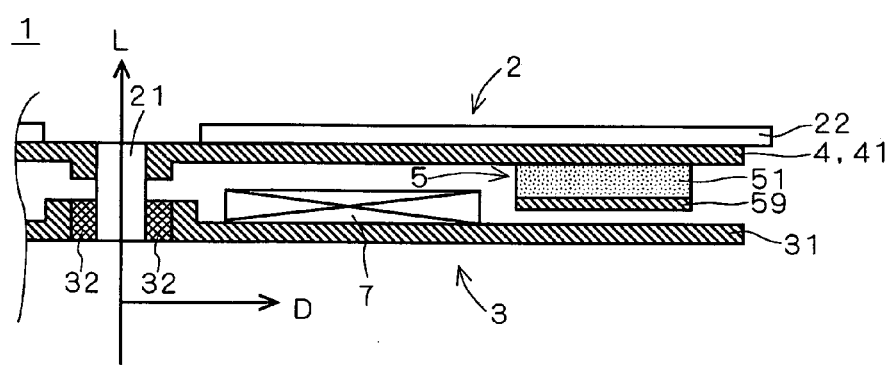
FIG. 23 is a sectional view illustrating one example of a structure of a brushless motor.

According to the representative example, the magnetic-field creating magnet 5 is placed closer to an axial center than the armature winding 7 as illustrated in FIG. 3 and the like. In contrast thereto, the magnetic-field creating magnet 5 may be placed closer to a periphery than the armature winding 7 as illustrated in FIG. 23. Also in this case, by placing the magnetic-field creating magnet 5 and the armature winding 7 to at least locally face each other in the radial direction D, a thickness extending in the axial direction L can be reduced, to thereby allow for thinning of the motor.

Figure 24:
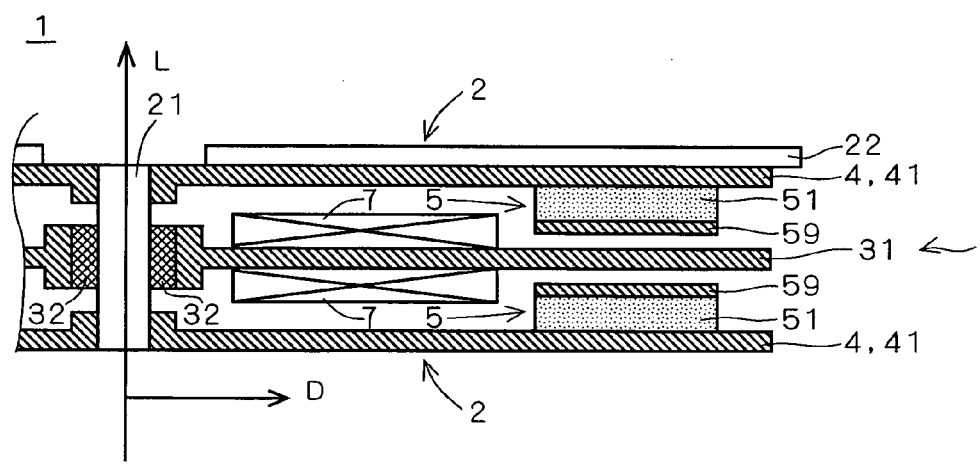
FIG. 24 is a sectional view illustrating one example of a structure of a brushless motor.

As a matter of course, plural motor sets each of which is illustrated in FIG. 23 and includes the stator 3 and the rotor 2 can be connected to each other to be arranged in the axial direction L, while being centered on the rotation axis 21 in common. FIG. 24 illustrates an example of the brushless motor 1 having a structure in which two motor sets each illustrated in FIG. 23 are connected to each other by joining respective stators 3 to each other. In the brushless motor 1 illustrated in FIG. 24, a single stator yoke plate 31 is shared by the two motor sets.

Figure 25:
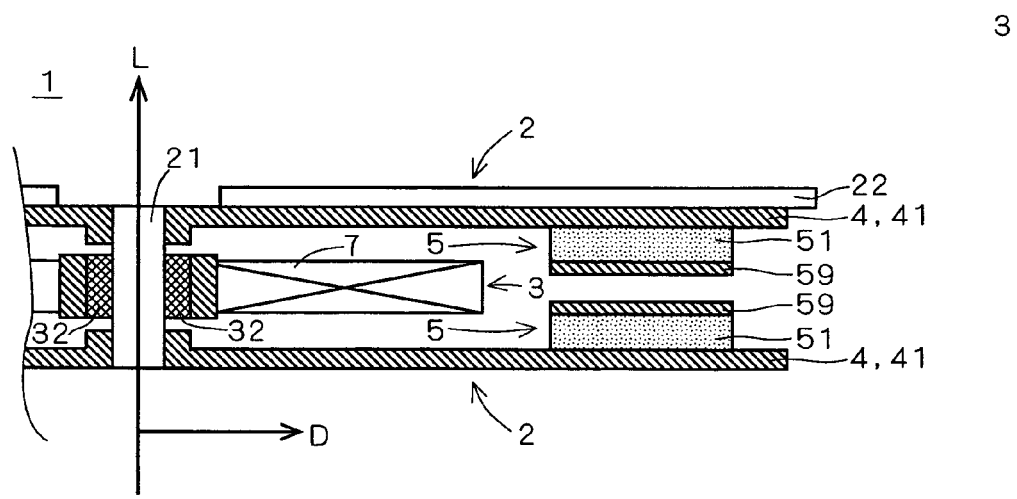
FIG. 25 is a sectional view illustrating one example of a structure of a brushless motor.

Additionally, one of the armature windings 7 and the single stator yoke plate 31 can be further omitted in the brushless motor 1 having the structure illustrated in FIG. 24. FIG. 25 illustrates the brushless motor 1 in which one of the armature windings 7 and the stator yoke plate 31 are omitted. As illustrated in FIG. 25, the stator 3 of the brushless motor 1 includes a single armature winding 7 and the bearing 32, but does not include the stator yoke plate 31. Then, two rotors 2 are connected to each other to be arranged in the axial direction L with the single stator 3 being interposed therebetween, while being centered on the rotation axis 21 in common.

During rotational movement of the brushless motor 1 illustrated in FIG. 25, the north pole and the south pole are short-circuited to each other by the short-circuit yoke plate 59, so that a magnetic path running though the short-circuit yoke plate 59 is formed in the same manner as in the representative example, on a side on which the short-circuit yoke plate 59 is placed with respect to the magnetic-field creating magnet 5. On the other hand, on the other side on which the short-circuit yoke plate 59 is not placed with respect to the magnetic-field creating magnet 5, a magnetic path running across the two rotors 2 is formed. More specifically, a magnetic flux starting from the north pole of the magnetic-field creating magnet 5 of one rotor 2 out of the two rotors 2 first passes through the subsidiary yoke plate 41 of the one rotor 2, and subsequently, crosses over an air gap formed in a space where the armature winding 7 of the stator 3 is placed. Then, the magnetic flux travels toward the subsidiary yoke plate 41 of the other rotor 2 out of the two rotors 2. Thereafter, the magnetic flux passes through the subsidiary yoke plate 41 of the other rotor 2, and returns to the south pole of the magnetic-field creating magnet 5 of the other rotor 2. To employ the foregoing structure would cause magnetic fluxes provided from two rotors 2 (two magnetic-field creating magnets 5) to link a single stator 3 (a single armature winding 7). Accordingly, as only one armature winding 7 is necessary, thinning of the brushless motor 1 can be achieved. Also, torque can be increased because magnetic fluxes provided from two magnetic-field creating magnets 5 are added to be utilized for rotational movement of the brushless motor 1.

<A-3. Drive Circuit>

Next, the drive circuit 8 will be described (refer to FIG. 1). Any of three examples of the drive circuit 8, which will be described below, can be employed as the drive circuit 8.

<A-3-1. Rectangular-Wave Drive>

Figure 26:
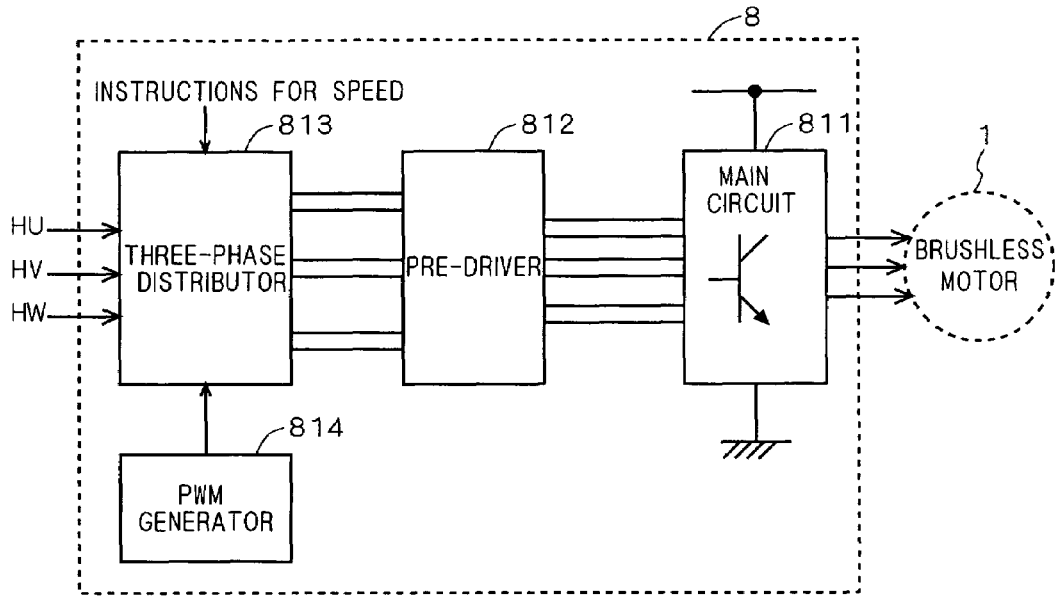
FIG. 26 is a view illustrating one example of a structure of a drive circuit.

FIG. 26 is a view illustrating one example of a structure of the drive circuit 8. As illustrated in FIG. 26, the present example of the drive circuit 8 includes a main circuit 811, a pre-driver 812, a three-phase distributor 813, and a PWM generator 814, and is designed such that a rectangular-wave drive current is supplied to the armature winding 7 of the brushless motor 1.

In the present example, the armature winding 7 of the brushless motor 1 is placed in three phases, in each of which a position of a magnetic pole of the magnetic-field creating magnet 5 is detected, so that three signals HU, HV, and HW displaced 120 electrical degrees with respect to one another are output and then input to the three-phase distributor 813. Also, the PWM generator 814 generates a triangular wave or a sawtooth wave as a carrier component, which is then input to the three-phase distributor 813. The three-phase distributor 813 generates three-phase fundamental waves in accordance with the generated three signals and instructions for speed, and inputs the generated three-phase fundamental waves to the main circuit 811 via the pre-driver 812. As a result, a rectangular-wave drive current is supplied to the brushless motor 1 from the main circuit 811. To employ the drive circuit 8 according to the present example which supplies a rectangular-wave drive current to the brushless motor 1 could simplify the structure of the drive circuit 8.

<A-3-2. Sinusoidal Drive>

Figure 27:
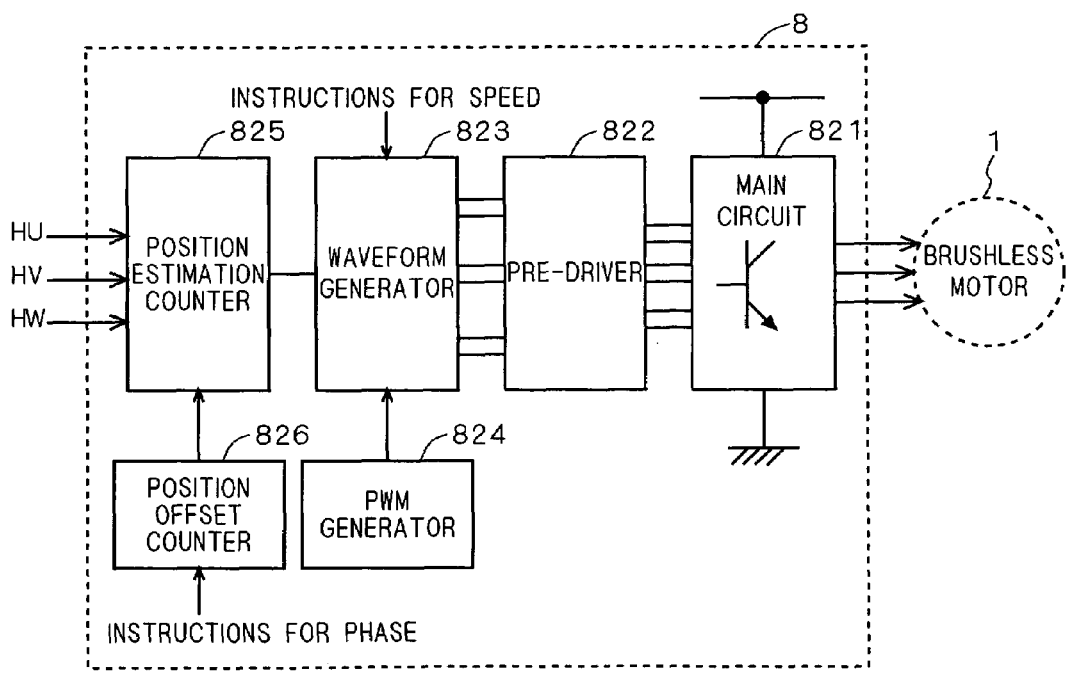
FIG. 27 is a view illustrating one example of a structure of a drive circuit.

FIG. 27 is a view illustrating one example of the structure of the drive circuit 8. As illustrated in FIG. 27, the present example of the drive circuit 8 includes a main circuit 821, a pre-driver 822, a waveform generator 823, a PWM generator 824, a position estimation counter 825, and a position offset counter 826, and is designed such that a sinusoidal drive current is supplied to the armature winding 7 of the brushless motor 1.

Also in the present example, the armature winding 7 of the brushless motor 1 is placed in three phases, in each of which a position of a magnetic pole of the magnetic-field creating magnet 5 is detected, and three signals HU, HV, and HW displaced 120 electrical degrees with respect to one another are output and then input to the position estimation counter 825.

The position estimation counter 825 uses the three signals HU, HV, and HW as signals indicating timings which are displaced 60 electrical degrees with respect to one another in measuring a length of an interval of the 60-degree electrical angles by counting. Thus, the position estimation counter 825 estimates a position of a magnetic pole of the magnetic-field creating magnet 5 and generates a sinusoidal reference signal in accordance with the estimated position of a magnetic pole. The phase of the generated sinusoidal reference signal is corrected based on a signal supplied from the position offset counter 826 to which instructions for phase are input.

The waveform generator 823 generates three-phase fundamental waves in three phases based on the reference signal supplied from the position estimation counter 825, the triangular waver or the sawtooth wave supplied from the PWM generator 824, and the instructions for speed. Then, the three-phase generated fundamental waves are input to the main circuit 821 via the pre-driver 822. As a result, a sinusoidal drive current is supplied to the brushless motor 1 from the main circuit 821. To employ the drive circuit 8 according to the present example which supplies a sinusoidal drive current to the brushless motor 1 would allow low-noise drive of the brushless motor 1.

Figure 28:
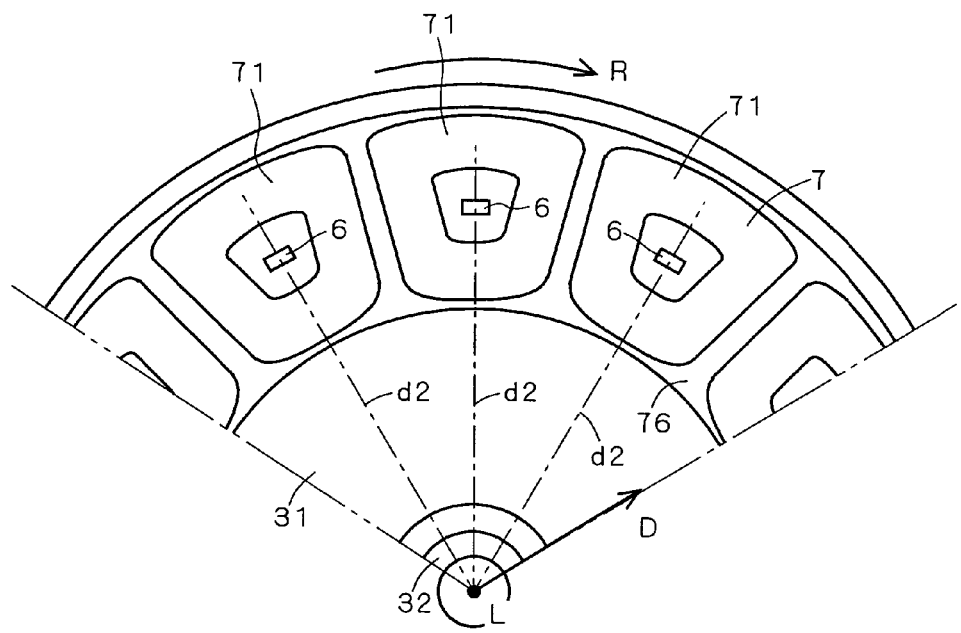
FIG. 28 is a view illustrating one example of arrangement of Hall effect devices.
Figure 29:
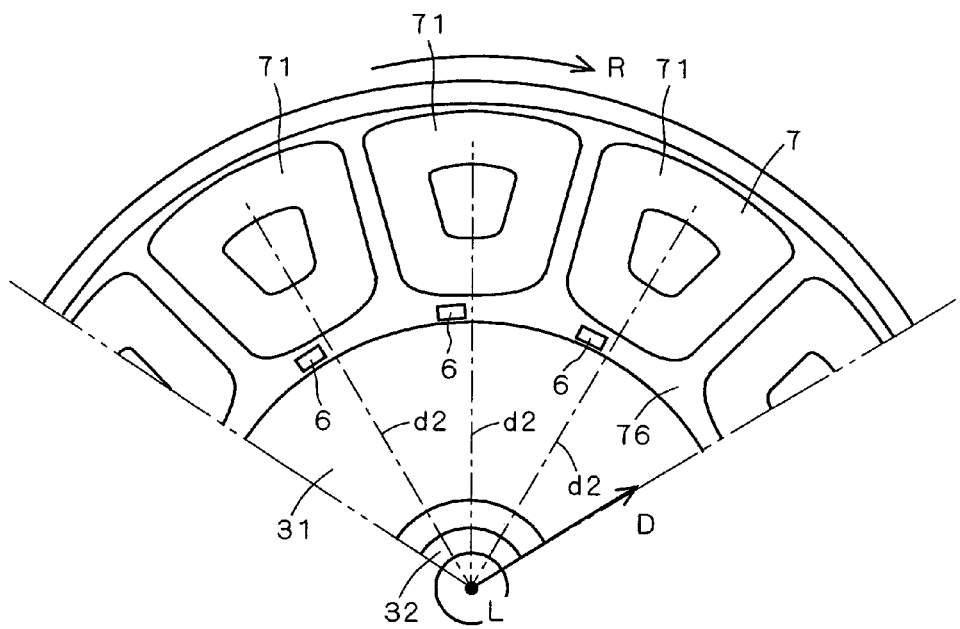
FIG. 29 is a view illustrating one example of arrangement of Hall effect devices.

Additionally, in a case where the drive circuit 8 having the structure illustrated in either FIG. 26 or FIG. 27 is employed, a Hall effect device 6 serving as a position detection sensor is placed in each of phases in the brushless motor 1. Then, the Hall effect devices 6 placed in the respective phases output the above-described signals HU, HV, and HW. In general, each of the Hall effect devices 6 is placed in a substantially central region of the coil 71 of the armature winding 7 as illustrated in FIG. 28. However, each of the Hall effect devices 6 may be placed in a position which is displaced with respect to a straight line d2 extending from the rotation axis 21 to the substantially central region of the coil 71 in the radial direction D, in a direction opposite to the rotation direction R, as illustrated in FIG. 29.

As generally known, a phase of a current lags behind a phase of a voltage under the influence of inductance of a coil in a motor. However, to place the Hall effect device 6 in a position which is displaced in a direction opposite to the rotation direction R as illustrated in FIG. 29 could avoid the above-mentioned phase lag of a current. Also, it is possible to effectively use reluctance torque, to thereby improve the torque and the efficiency of the motor.

<A-3-3. Sensorless Drive>

Figure 30:
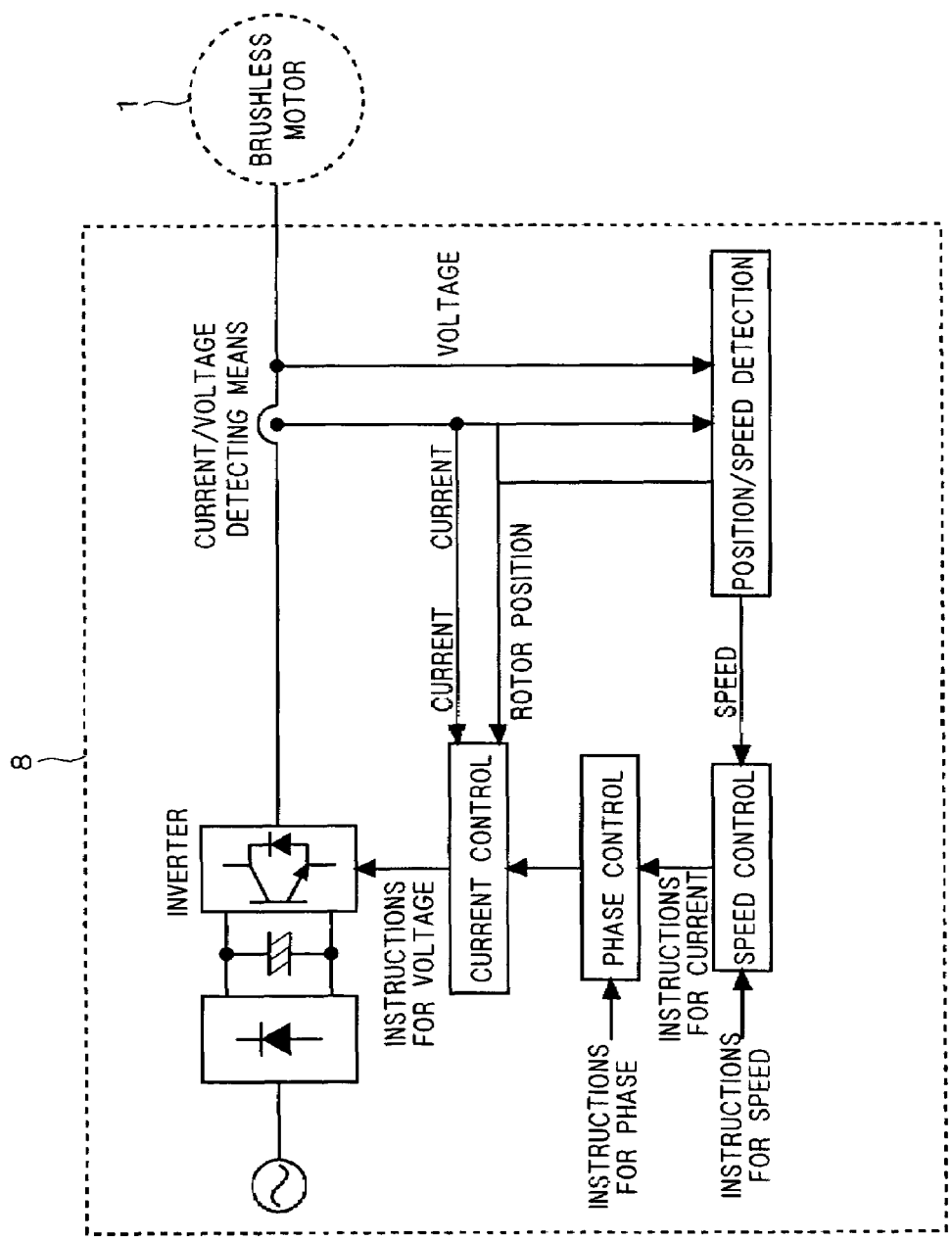
FIG. 30 is a view illustrating one example of a structure of a drive circuit.

FIG. 30 is a view illustrating one example of the structure of the drive circuit 8. The example of the drive circuit 8 illustrated in FIG. 30 is designed such that an induced voltage of the armature winding 7 is detected and a position of a magnetic pole of the magnetic-field creating magnet 5 is estimated based on the detected induced voltage. Further, in the drive circuit 8, a drive current is supplied to the armature winding 7 of the brushless motor 1 based on the estimated position of a magnetic pole of the magnetic-field creating magnet 5. Accordingly, the present example of the drive circuit 8 allows sensorless drive of the brushless motor 1 which does not use a position detection sensor such as the Hall effect device 6. The principles of such sensorless drive are disclosed in the non-patent document 1 and the non-patent document 2, for example. To employ the drive circuit 8 which allows sensorless drive would eliminate the need of providing a position detection sensor such as a Hall effect device, to thereby achieve further thinning of the motor.

Additionally, in the present example, it is preferable that the phase of the drive current supplied to the brushless motor 1 is set forward to the phase of the detected induced voltage. To do so also could avoid phase lag of a current behind a voltage under the influence of inductance of a coil. Further, it is possible to effectively use reluctance torque, to thereby improve the torque and the efficiency of the motor.

B. SECOND PREFERRED EMBODIMENT

<B-1. Basic Structure and Operations>

Figure 31:
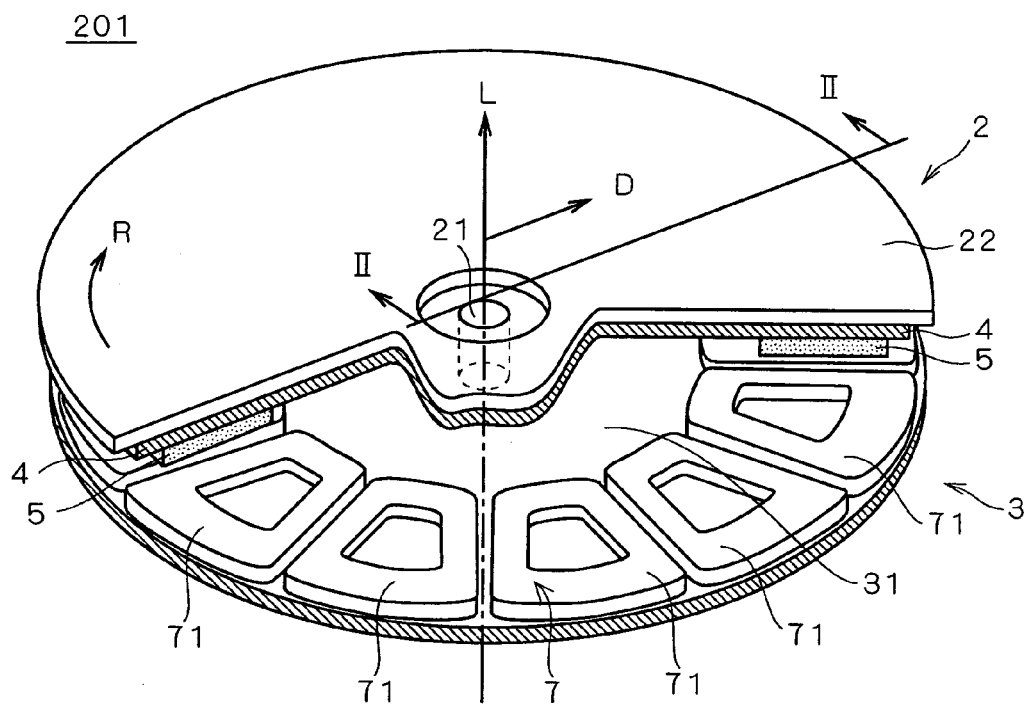
FIG. 31 is a perspective view illustrating a structure of a brushless motor.
Figure 32:
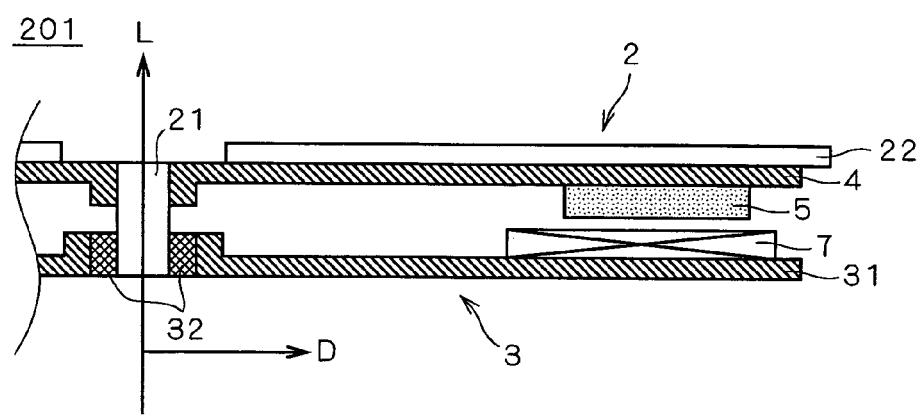
FIG. 32 is a sectional view illustrating a structure of a brushless motor.

FIG. 31 and FIG. 32 are views illustrating principal components of a motor according to a second preferred embodiment. FIG. 31 is a perspective view and FIG. 32 is a sectional view taken along a line II-II in FIG. 31. The motor according to the second preferred embodiment is designed as an axial gap brushless motor 201. As illustrated in FIGS. 31 and 32, the brushless motor 201 includes the stator 3 and the rotor 2 rotatable relative to the stator 3 on the rotation axis 21, as the principal components thereof. FIG. 31 includes a cutaway view illustrating a portion of the rotor 2 in order to facilitate visual recognition of a structure.

The rotor 2 includes the stiffening part 22, the rotor yoke plate 4, and the magnetic-field creating magnet 5 which are stacked in the axial direction L in order of mention when viewed from a positive side.

The rotor yoke plate 4 is formed of a disc-shaped magnetic material, and a center of the disc thereof is secured to the rotation axis 21 such that a flat portion of the plate 4 is orthogonal to the axial direction L. The stiffening part 22 is in the shape of a disc having a diameter which is larger than that of the rotor yoke plate 4. The stiffening part 22 is adhered to the flat portion of the rotor yoke plate 4 such that a center of the disc thereof corresponds to the center of the rotation axis 21.

On the other hand, the magnetic-field creating magnet 5 has the shape of a ring (the shape of a disc including a circular opening in a central region thereof) having a diameter which is smaller than that of the rotor yoke plate 4. Also the magnetic-field creating magnet 5 is adhered to the flat portion of the rotor yoke plate 4 such that a center of the disc corresponds to the center of the rotation axis 21. Accordingly, the flat portion of the magnetic-field creating magnet 5 is placed orthogonally to the axial direction L. Further, the magnetic-field creating magnet 5 has magnetic poles which are arranged along a thickness extending in the axial direction L and are different from each other in polarity. Therefore, a direct magnetic flux of the magnetic-field creating magnet 5 (a magnetic flux starting from the magnetic-field creating magnet 5 or a magnetic flux entering the magnetic-field creating magnet 5) is to travel in the axial direction L. The number of magnetic poles provided in one surface of the magnetic-field creating magnet 5 is not limited to any specific number.

The stator 3 includes the armature winding 7 and the stator yoke plate 31 which are stacked in the axial direction L in order of mention when viewed from a positive side.

The stator yoke plate 31 is formed of a disc-shaped magnetic material, and is provided with the bearing 32 in a center of the disc. The rotation axis 21 is fitted into the bearing 32, so that the rotation axis 21 is supported rotatably relative to the stator yoke plate 31. Also, as a result of the rotation axis 21 being fitted into the bearing 32, the stator yoke plate 31 is placed such that a flat portion thereof is orthogonal to the axial direction L. Accordingly, a direct magnetic flux of the magnetic-field creating magnet 5 is orthogonal to the flat portion of the stator yoke plate 31.

The armature winding 7 includes a plurality of coils 33 which are arranged along one circle centered on the rotation axis 21. As illustrated in FIG. 32, the armature winding 7 is adhered to one of opposite surfaces of the stator yoke plate 31, which surface is located on a positive side in the axial direction L, such that the armature winding 7 faces the magnetic-field creating magnet 5 in the axial direction L.

Figure 33:
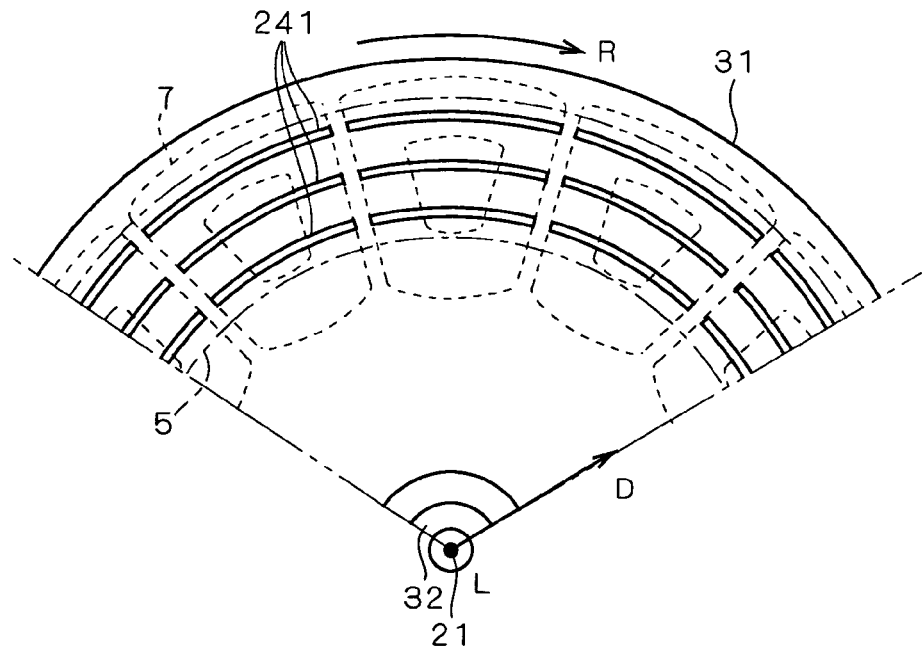
FIG. 33 is a view illustrating one example of non-conductive parts formed in a stator yoke plate.

Further, a plurality of slits are formed in the stator yoke plate 31. FIG. 33 is a view illustrating a portion of the stator yoke plate 31 when viewed from a positive side in the axial direction L. In FIG. 33, the armature winding 7 adhering to the stator yoke plate 31 is represented by broken lines and the magnetic-field creating magnet 5 which faces the armature winding 7 is represented by dashed lines (the same representing way is employed also in FIGS. 34, 35, 36, and 37 which will be later referred to).

As illustrated in FIG. 33, a plurality of slits 241 each of which is an elongated air space extending in the rotation direction R are formed in three layers which are arranged in the radial direction D, in the stator yoke plate 31. Each of the three layers includes some of the plurality of slits 241. In other words, some of the plurality of slits 241 are placed along each of three circles which are centered on the rotation axis 21 and have different diameters. The diameters of the three circles are set to allow the positions of the slits 241 and a rotation path of the magnetic-field creating magnet 5 to overlap each other in the axial direction L. Specifically, the plurality of slits 241 are formed to extend orthogonally to the radial direction D in positions where a direct magnetic flux of the magnetic-field creating magnet 5 passes during rotational movement of the rotor 2.

When a predetermined current is flown through the armature winding 7 of the brushless motor 201 having the foregoing structure, the magnetic-field creating magnet functions as a magnetic field and the rotor 2 makes rotational movement relative to the stator 3. During rotational movement of the rotor 2, a magnetic flux of the magnetic-field creating magnet 5 of the rotor 2 travels in the rotation direction R while also extending orthogonally to the flat portion of the stator yoke plate 31. Accordingly, an induced eddy current tends to occur in either the radial direction D or a direction opposite to the radial direction D by Fleming's right-hand rule in a portion of the stator yoke plate 31 which overlaps a rotation path of the magnetic-field creating magnet 5 in the axial direction L.

However, in the brushless motor 201 according to the second preferred embodiment, the slits 241 serving as non-conductive parts each of which extends in the rotation direction R are formed in the stator yoke plate 31. Thus, as the non-conductive slits 241 are formed to extend orthogonally to a direction in which an eddy current tends to occur, it is possible to effectively suppress occurrence of an eddy current. Therefore, iron loss can be reduced, to thereby improve the efficiency of the brushless motor 201. Also, because of the locations of the plurality of slits 241 which are formed to overlap a rotation path of the magnetic-field creating magnet 5 in the axial direction L, occurrence of an eddy current can be more effectively suppressed.

Moreover, the slits 241 each of which is an elongated air space are employed as the non-conductive parts formed in the stator yoke plate 31. As such, a process for forming the non-conductive parts is simple, to save manufacturing costs for the brushless motor 201.

<B-2. Modifications of Non-Conductive Part>

The shapes and the arrangement of the non-conductive parts formed in the stator yoke plate 31 are not limited to those illustrated in FIG. 33, and various modifications are possible. Below, various modifications of the non-conductive parts which can be employed in the brushless motor 201 according to the second preferred embodiment will be described.

<B-2-1. First Modification>

Figure 34:
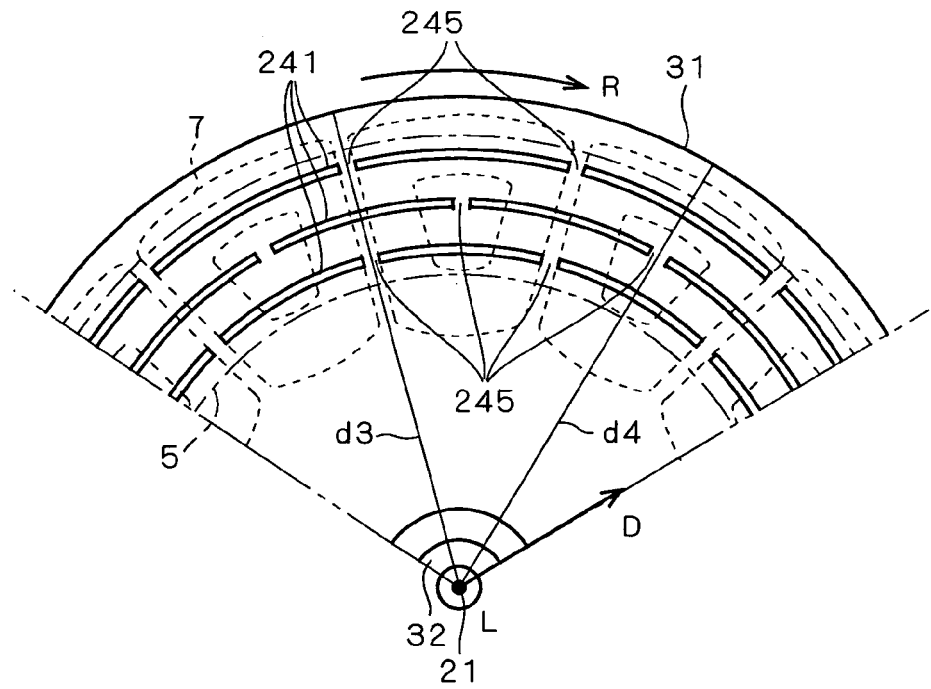
FIG. 34 is a view illustrating one example of non-conductive parts formed in a stator yoke plate.

FIG. 34 is a view illustrating one alternative example of the non-conductive parts formed in the stator yoke plate 31. According to the present example, the plurality of slits 241 are formed such that at least one slit 241 is present in a position at every angle along the rotation direction R in a range between the rotation axis 21 and a periphery of the stator yoke plate 31.

Also in the present example, the plurality of slits 241 each extending in the rotation direction R are formed in three layers which are arranged in the radial direction D, in the stator yoke plate 31. When an attention is drawn to one of the three layers, it is found that portions 45 in which none of the slits 241 is formed (portions between adjacent slits 241) are provided in some positions at certain angles along the rotation direction R on paths each extending from the rotation axis 21 to the periphery of the stator yoke plate 31 in the radial direction D. That is, the portions 45 in which none of the non-conductive parts is placed (which will hereinafter be referred to as "conductive parts") are provided.

Nonetheless, according to the present example, the non-conductive parts are formed such that when the conductive part 45 of a given layer is provided on a given path extending in the radial direction D, at least one slit 241 of another layer is certainly present on the same given path. For example, assume that the three layers of the slits 241 are referred to a "first layer", a "second layer", and a "third layer", starting from the innermost one. When an attention is drawn to a path d1 illustrated in FIG. 34, it is found that while the conductive part 45 is provided in each of the first layer and the third layer, the slit 241 is present in the second layer. Also, when an attention is drawn to a path d2 illustrated in FIG. 34, while the conductive part 45 is provided in the second layer, the slit 241 is present in each of the first layer and the third layer.

As described above, by ensuring that the slit 241 is certainly present somewhere in the radial direction D between the rotation axis 21 and the periphery of the stator yoke plate 31, occurrence of an eddy current can be effectively suppressed. Also, higher strength versus deformation of the stator yoke plate 31 at a time of formation of the slits 241 can be maintained as compared to the structure illustrated in FIG. 33.

<B-2-2. Second Modification>

Figure 35:
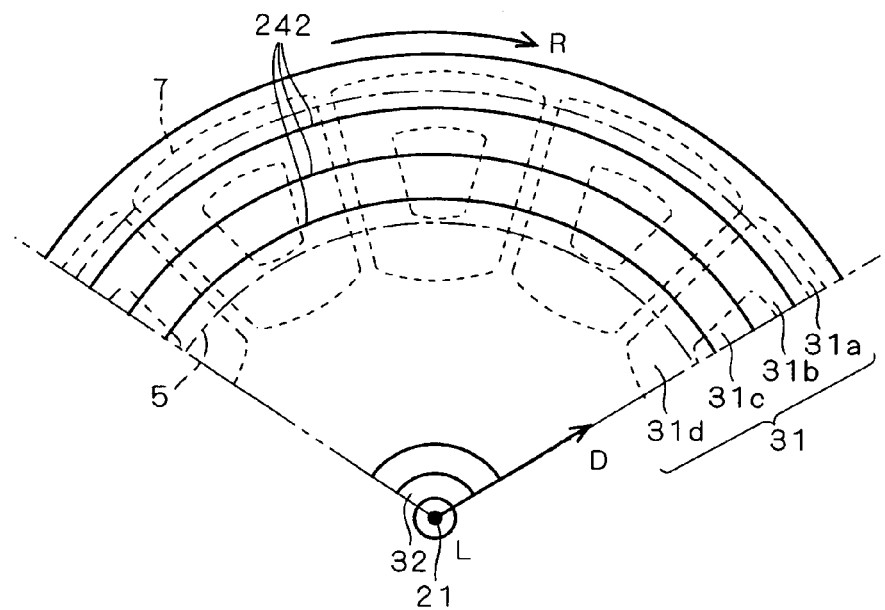
FIG. 35 is a view illustrating one example of non-conductive parts formed in stator yoke plate.

FIG. 35 is a view illustrating another alternative example of the non-conductive parts formed in the stator yoke plate 31. According to the present example, the stator yoke plate 31 includes a plurality of magnetic plates 31a, 31b, 31c, and 31d having boundaries which extend along circles centered on the rotation axis 21. Then, the boundaries 242 between the plurality of magnetic plates serve as the non-conductive parts.

The stator yoke plate 31 according to the present example includes a combination of three magnetic plates 31a, 31b, and 31c each of which is ring-shaped and the magnetic plate 31d which is disc-shaped. An outside diameter of the magnetic plate 31b, an outside diameter of the magnetic plate 31c, and outside diameter of the magnetic plate 31d are set to be slightly smaller than an inside diameter of the magnetic plate 31a, an inside diameter of the magnetic plate 31b, and an inside diameter of the magnetic plate 31c, respectively. Accordingly, when the magnetic plates 31a, 31b, and 31c are combined such that each of respective centers thereof corresponds to the center of the rotation axis 21, three circular spaces each of which has an extremely small width extending in the radial direction D and is centered on the rotation axis 21 are formed in the boundaries 242 between the magnetic plates (the overall shape of the stator yoke plate 31 is similar to that illustrated in FIG. 31 and FIG. 32). In other words, the three boundaries (three-layer spaces) 242 between the magnetic plates are formed to serve as the non-conductive parts each extending in the rotation direction R in the stator yoke plate 31. The three boundaries 242 between the magnetic plates are arranged such that each of the boundaries overlaps a rotation path of the magnetic-field creating magnet 5 in the axial direction L. Also, according to the present example, an insulating coating is provided on each of surfaces of the magnetic plates which face the boundaries 242.

Also in the present example, because of formation of the non-conductive parts each extending in the rotation direction R in the stator yoke plate 31, occurrence of an eddy current can be suppressed. Further, the width of each of the non-conductive parts which extends in the radial direction D can be considerably reduced because the boundaries 242 between the plurality of magnetic plates 31a, 31b, 31c, and 31d which extend along circles centered on the rotation axis 21 serve as the non-conductive parts. Accordingly, magnetic reluctance of the stator yoke plate 31 can be reduced during rotational movement of the brushless motor 201. This improves magnetic saturation, to thereby further improve the efficiency of the brushless motor 201. Further, even in a case where it is difficult to form a slit with an extremely small width in the stator yoke plate 31, a fine non-conductive part can be easily formed. Moreover, according to the present example, as the insulating coating is provided to face each of the boundaries 242 between the magnetic plates, current leakage in the boundaries 242 is prevented, so that occurrence of an eddy current can be effectively suppressed.

<B-2-3. Third Modification>

Figure 36:
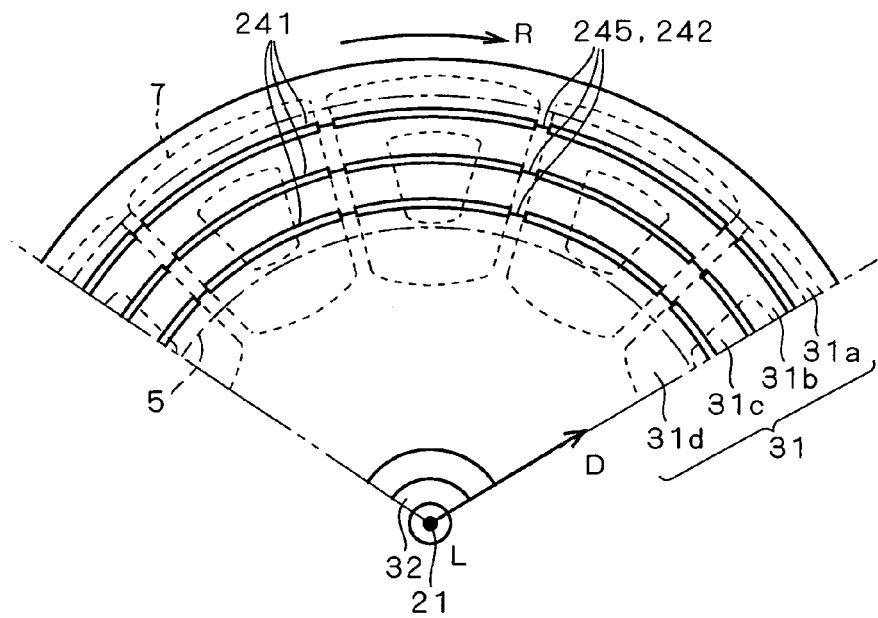
FIG. 36 is a view illustrating one example of non-conductive parts formed in a stator yoke plate.

FIG. 36 is a view illustrating yet another alternative example of the non-conductive parts formed in the stator yoke plate 31. A structure of the stator yoke plate 31 according to the present example corresponds to a combination of the structures illustrated in FIG. 33 and FIG. 35.

More specifically, according to the present example, the stator yoke plate 31 includes a combination of the three ring-shaped magnetic plates 31a, 31b, and 31c, and the disc-shaped magnetic plate 31d in the same manner as in the example illustrated in FIG. 35. Further, the plurality of slits 241 each extending in the rotation direction R are formed in three layers which are arranged in the radial direction D in the same manner as in the example illustrated in FIG. 33. In the meantime, respective diameters of the three layers of the plurality of slits 241 are identical to respective diameters of the three boundaries between the magnetic plates, respectively.

In the stator yoke plate 31 according to the present example, both the plurality of slits 241 and the boundaries 242 between the magnetic plates serve as the non-conductive parts each extending in the rotation direction R. Also, the respective diameters of the layers of the plurality of slits 241 are identical to the respective diameters of the boundaries 242 between the magnetic plates, respectively, so that any of the boundaries 242 between the magnetic plates is certainly present in each of the portions 45 between adjacent slits 241 in the same layer, as illustrated in FIG. 36. Hence, occurrence of an eddy current can be effectively suppressed.

Figure 37:
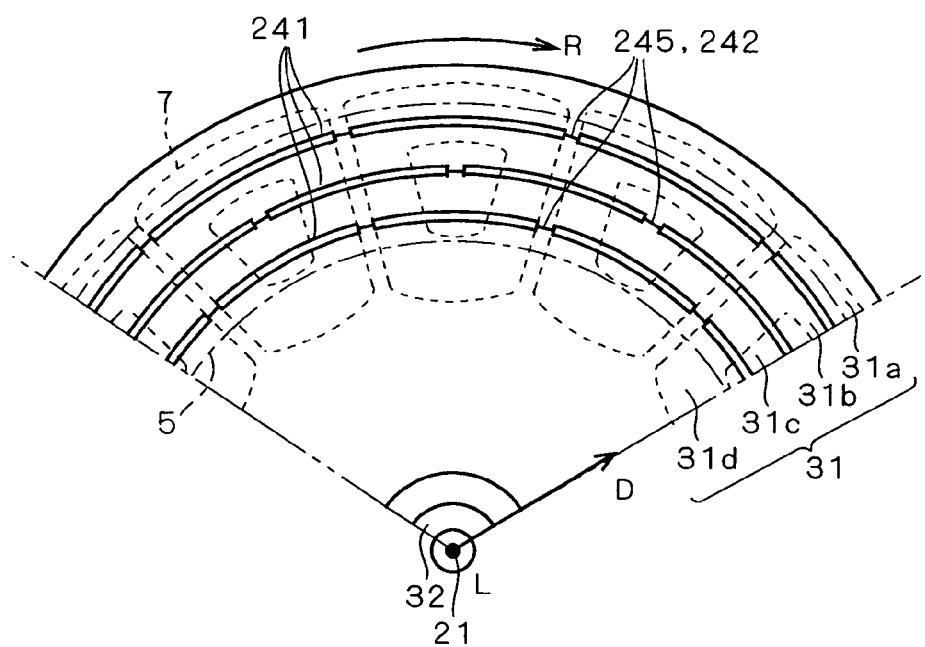
FIG. 37 is a view illustrating one example of non-conductive parts formed in a stator yoke plate.

Additionally, the structures illustrated in FIG. 34 and FIG. 35 may be combined such that one slit 241 is certainly present somewhere in the radial direction D, i.e., in a position at every angle along the rotation direction R, as illustrated in FIG. 37. This makes it possible to more effectively suppress occurrence of an eddy current.

<B-3. Other Modifications of Second Preferred Embodiment>

According to the second preferred embodiment, the armature winding 7 and the magnetic-field creating magnet 5 face each other in the axial direction L as described above. In contrast, the armature winding 7 and the magnetic-field creating magnet 5 may face each other in the radial direction D in the same manner as in the first preferred embodiment. Also in a brushless motor having the same structure as the brushless motor according to the first preferred embodiment, a magnetic flux travels while also extending orthogonally to the stator yoke plate 31, so that an induced eddy current tends to occur in either the radial direction D, or a direction opposite to the radial direction D, in the stator yoke plate 31. Such occurrence of an eddy current can be prevented by forming non-conductive parts in the stator yoke plate 31 in the same manner as in the second preferred embodiment. For the shapes and arrangements of the non-conductive parts, any of those illustrated in FIGS. 33 through 37 can be employed.

Though the slits 241 are formed in three layers which are arranged in the radial direction D according to the second preferred embodiment, the number of layers of the slits 241 is not limited to three and the slits 241 may be formed in either a single layer or plural layers. However, in order to ensure that one slit 241 is certainly present somewhere in the radial direction D, i.e., in a position at every angle along the rotation direction R, as illustrated in FIG. 34, plural layers are necessary.

Though the three boundaries 242 between the plural magnetic plates are laid side by side in the radial direction D according to the second preferred embodiment, it is sufficient that at least one boundary is provided.

Though the non-conductive parts are curved in the rotation direction R according to the second preferred embodiment, the non-conductive parts may be linear, provided that at least a portion of the non-conductive parts extends in the rotation direction R such that it is orthogonal to the radial direction D.

<C. Applications>

Hereinbefore, the brushless motor 1 according to the first preferred embodiment and the brushless motor 201 according to the second preferred embodiment have been described. The brushless motors 1 and 201 can be suitably applied to various systems, in particular, an air conditioner, because of thinness and high torque thereof. Below, a specific example of an air conditioner to which the brushless motor 1 according to the first preferred embodiment is applied will be described.

<C-1. Blower>

Figure 38:
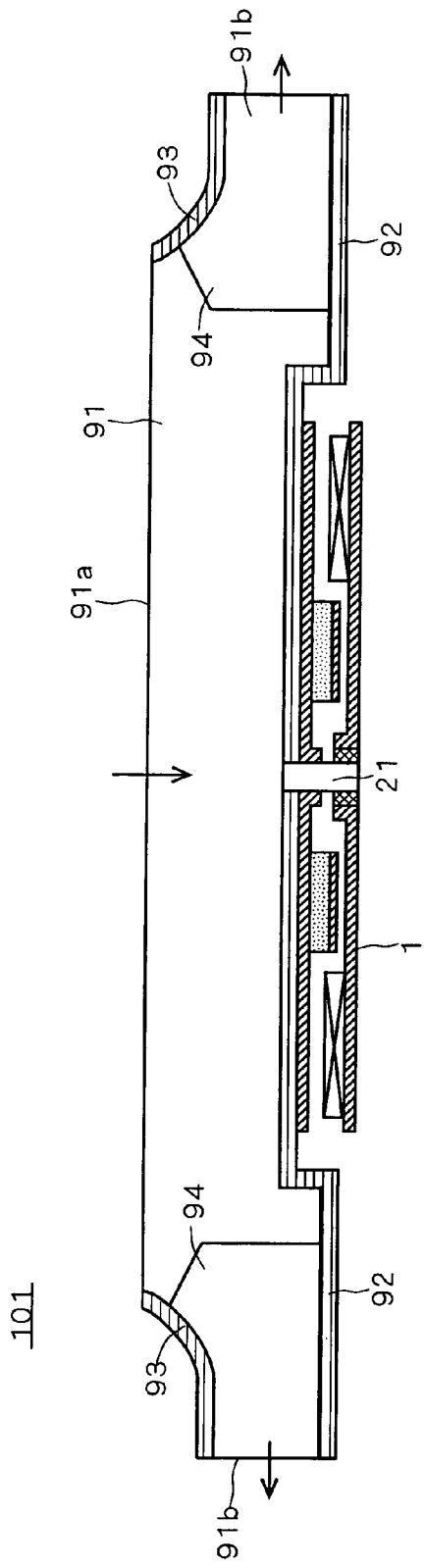
FIG. 38 is a sectional view illustrating one example of a structure of a blower to which a brushless motor is applied.

FIG. 38 is a sectional view illustrating one example of a structure of a blower to which the brushless motor 1 is applied. The blower 101 is designed as a centrifugal blower employed as an indoor machine of an air conditioner, and includes a fan 91 serving as a rotating mechanism for forming an air flow path.

The fan 91 includes a hub 92, a plurality of blades 94 which are placed at equal intervals along a circumference in a periphery of the hub 92, and a shroud 93 covering the hub 92 and the blades 94. A central portion of the shroud 93 serves as an intake 91a of the blower 101 while an outer surface of each of the blades 94 serves as an outlet 91b of the blower 101. Thus, in response to rotation of the fan 91, air is took in from the intake 91a and air is let out from the outlet 91b.

In the blower 101, the brushless motor 1 is employed as means for driving the fan 91. A center on which the fan 91 is rotated is secured to the rotation axis 21 of the brushless motor 1. To apply the brushless motor 1 which is thin and yields high torque to a blower in the foregoing manner would make it possible to provide a compact, power-saving blower. For the structure of the brushless motor 1, any of those described in the first preferred embodiment can be employed. Further, the brushless motor 201 according to the second preferred embodiment can be applied to the blower 101 illustrated in FIG. 38, in place of the brushless motor 1. In a case where the brushless motor 201 is applied, any of the structures described in the second preferred embodiment can be employed. To apply the brushless motor 201 would make it possible to provide a low power consuming blower.

<C-2. Compressor>

Figure 39:
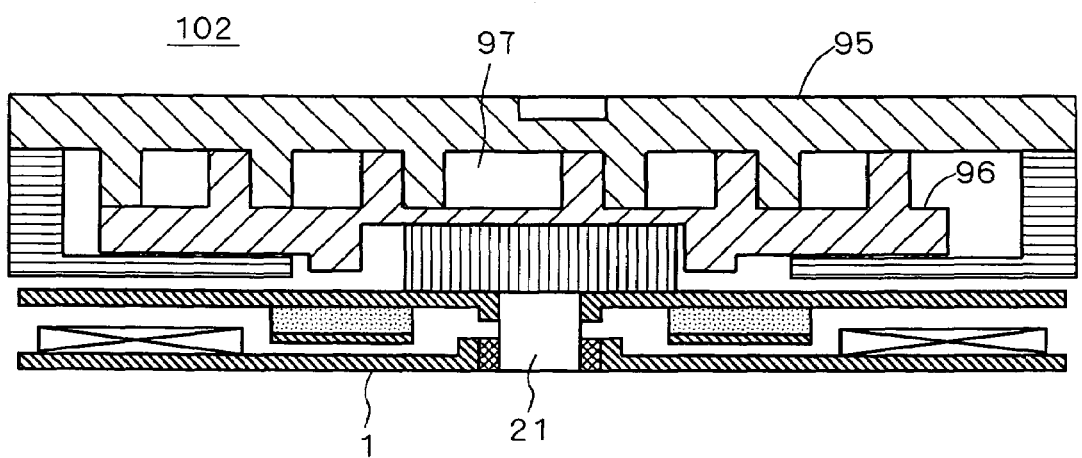
FIG. 39 is a sectional view illustrating one example of a structure of a scroll compressor to which a brushless motor is applied.

FIG. 39 is a sectional view illustrating an example of a structure of a scroll compressor to which the brushless motor 1 is applied. The scroll compressor 102 is designed as a compressor of refrigerant gas for an air conditioner, and includes a fixed scroll 95 and an orbiting scroll 96 serving as a rotating mechanism.

Each of the fixed scroll 95 and the orbiting scroll 96 includes a lap, and the respective laps are placed to be engaged with each other. When the orbiting scroll 96 is rotated, refrigerant gas flown into a compression room 97 formed of a space between the laps is compressed.

In the scroll compressor 102, the brushless motor 1 is employed as means for driving the orbiting scroll 96. The orbiting scroll 96 is secured eccentrically to an axial center of the rotation axis 21 of the brushless motor 1. To apply the brushless motor 1 which is thin and yields high torque to a scroll compressor in the forgoing manner would make it possible to provide a compact, power-saving scroll compressor. For the structure of the brushless motor 1, any of those described in the first preferred embodiment can be employed. Also, a compressor having a compressing mechanism different from the compressing mechanism according to the present preferred embodiment may be employed. Further, the brushless motor 201 according to the second preferred embodiment can be applied to the scroll compressor 102 illustrated in FIG. 39, in place of the brushless motor 1. In a case where the brushless motor 201 is applied, any of the structures described in the second preferred embodiment can be employed. To apply the brushless motor 201 would make it possible to provide a low power consuming compressor.

What is claimed is:

1. A motor comprising:
an armature and a field element which are rotatable relative to each other on a rotation axis extending in a first direction, said armature including an armature winding which is placed at a distance in a second direction perpendicular to said first direction, from said rotation axis, and
said field element including
a plurality of first yoke plates each including one end which faces said armature winding in said first direction and an other end which does not face said armature winding in said first direction, each of said plurality of first yoke plates extending in said second direction, and
a magnetic-field creating magnet coupled to adjacent first yoke plates of said plurality of first yoke plates and having a north pole joined to said other end of one of said adjacent first yoke plates, a south pole joined to said other end of the other of said adjacent first yoke plates, and a U-shaped magnetic path which opens to said plurality of first yoke plates, said magnetic-field creating magnet at least locally facing said armature winding in said second direction,
the north pole and the south pole of said magnetic-field creating magnet being alternately disposed adjacent each other around said rotation axis on a common axial side of said magnetic-field creating magnet.

2. The motor according to claim 1, wherein
said one ends of said adjacent first yoke plates are connected to each other.

3. The motor according to claim 1, wherein
said other ends of said adjacent first yoke plates are connected to each other such that a junction between said other ends of said adjacent first yoke plates does not overlie a boundary between said north pole and said south pole.

4. The motor according to claim 1, wherein
each of said plurality of first yoke plates includes a linear outline parallel to said second direction.

5. The motor according to claim 1, wherein
an interval between said adjacent first yoke plates increases as a distance from said rotation axis increases in said second direction.

6. The motor according to claim 5, wherein
said interval between said adjacent first yoke plates non-linearly increases in proportion to said distance from said rotation axis.

7. The motor according to claim 1, wherein
said magnetic-field creating magnet is disc-shaped.

8. The motor according to claim 1, wherein
said magnetic-field creating magnet includes:
at least one permanent magnet in which a north pole and a south pole are laid side by side in said first direction; and
a second yoke plate which joins said north pole and said south pole of said permanent magnet on a side opposite to a side on which said plurality of first yoke plates are placed.

9. The motor according to claim 8, wherein
said permanent magnet is a bonded-magnet.

10. The motor according to claim 9, wherein
said permanent magnet is formed integrally with either said plurality of first yoke plates or said second yoke plate by injection molding.

11. The motor according to claim 8, wherein
a width of said second yoke plate extending in said second direction is larger than a width of said permanent magnet extending in said second direction.

12. The motor according to claim 8, wherein
a width of said second yoke plate extending in said first direction is larger than a width of said permanent magnet extending in said first direction.

13. The motor according to claim 8, wherein
a portion extending along a portion of said permanent magnet where different polarities are adjacent has a larger width extending in said first direction than said other portions in said second yoke plate.

14. The motor according to claim 1, wherein
said magnetic-field creating magnet includes:
at least two hexahedron-shaped permanent magnets in each of which a north pole and a south pole are laid side by side in said first direction; and
a second yoke plate which joins said south pole and said north pole of each of said permanent magnets on a side opposite to a side on which said plurality of first yoke plates are placed.

15. The motor according to claim 1, wherein
said armature further includes a substrate on which said armature winding is placed.

16. The motor according to claim 15, wherein
said armature winding is placed on each of surfaces of said substrate which are opposite to each other in said first direction.

17. The motor according to claim 16, wherein
said armature winding placed on one of said surfaces of said substrate and said armature winding placed on the other of said surfaces of said substrate are misaligned with each other in a rotation direction of said field element which is defined based on said armature.

18. The motor according to claim 15, wherein
said armature winding is a flat coil in which a conductor is formed by a photolithographic process.

19. The motor according to claim 1, wherein
said armature and said field element are paired to form one motor set, and
a plurality of motor sets are connected to be arranged in said first direction, said plurality of motor sets being centered on said rotation axis in common.

20. The motor according to clam 19, wherein
said armature windings respectively included in said plurality of motor sets are misaligned with one another in a rotation direction of said field element which is defined based on said armature.

21. The motor according to claim 1, wherein
said armature winding is placed closer to said rotation axis than said magnetic-field creating magnet, and
said field element and another field element similar to said field element are connected to each other to be arranged in said first direction with said armature being interposed therebetween, said field elements being centered on said rotation axis in common.

22. The motor according to claim 1, wherein
each of said first yoke plates includes a first flat portion which forms an air gap in a space between said first flat portion and said armature winding, and a second flat portion connected to said first flat portion, and
said first flat portion is placed closer to said armature winding than said second flat portion in said first direction.

23. The motor according to claim 1, wherein
said armature further includes at least one position detection sensor for detecting a position of a magnetic pole of said magnetic-field creating magnet, and
said position detection sensor is placed in a substantially central region of said armature winding.

24. The motor according to claim 23, further comprising
drive means for supplying either rectangular-wave or sinusoidal drive current to said armature winding based on an output of said position detection sensor.

25. The motor according to claim 1, wherein
said armature further includes at least one position detection sensor for detecting a position of a magnetic pole of said magnetic-field creating magnet, and
said position detection sensor is displaced with respect to a line extending from said rotation axis to a substantially central region of said armature winding in a direction opposite to a rotation direction of said field element which is defined based on said armature.

26. The motor according to claim 1, further comprising:
means for detecting an induced voltage of said armature winding;
means for estimating a position of a magnetic pole of said magnetic-field creating magnet from said induced voltage; and
drive means for supplying a drive current based on said estimated position of said magnetic pole of said magnetic-field creating magnet to said armature winding.

27. The motor according to claim 26, wherein
said drive means sets a phase of said drive current forward to a phase of said induced voltage.

28. A blower comprising:
said motor recited in claim 1; and
a fan which is rotated by said motor.

29. A compressor comprising
said motor recited in claim 1; and
a compressing mechanism which is rotated by said motor.

30. An air conditioner comprising:
said motor recited in claim 1; and
a rotation driving mechanism which is rotated by said motor.

* * * * *